United States Patent
Vadder et al.

(10) Patent No.: US 9,719,726 B2
(45) Date of Patent: Aug. 1, 2017

(54) BI-DIRECTIONAL FILL FOR USE IN COOLING TOWERS

(71) Applicant: Evapco, Inc., Taneytown, MD (US)

(72) Inventors: Davey J. Vadder, Manchester, MD (US); Sarah L. Ferrari, Mount Airy, MD (US); John W. Lane, Finksburg, MD (US); Jean-Pierre Libert, Frederick, MD (US); Thomas W. Bugler, Middletown, MD (US)

(73) Assignee: Evapco, Inc., Taneytown, MD (US)

( * ) Notice: Subject to any disclaimer, the term of this patent is extended or adjusted under 35 U.S.C. 154(b) by 0 days.

(21) Appl. No.: 14/757,640

(22) Filed: Dec. 23, 2015

(65) Prior Publication Data
US 2017/0003078 A1    Jan. 5, 2017

Related U.S. Application Data

(60) Provisional application No. 62/096,194, filed on Dec. 23, 2014, provisional application No. 62/148,969, filed on Apr. 17, 2015.

(51) Int. Cl.
| | | |
|---|---|---|
| F28C 1/14 | (2006.01) | |
| F28F 25/08 | (2006.01) | |
| F28D 9/00 | (2006.01) | |
| F28F 3/02 | (2006.01) | |
| F28C 1/00 | (2006.01) | |

(52) U.S. Cl.
CPC .............. *F28C 1/14* (2013.01); *F28D 9/0062* (2013.01); *F28F 3/025* (2013.01); *F28F 25/08* (2013.01); *F28F 25/087* (2013.01); *F28C 2001/006* (2013.01); *F28C 2001/145* (2013.01)

(58) Field of Classification Search
CPC ...... B01J 2219/3221; B01J 2219/32217; B01J 2219/3222; F28C 2001/006; F28C 2001/145; F28C 1/14; F28F 25/085; F28F 25/087; F28F 3/025; F28F 25/08; F28D 9/0062; Y10S 261/11
USPC ........................................ 261/112.2, DIG. 11
See application file for complete search history.

(56) References Cited

U.S. PATENT DOCUMENTS

| | | | | |
|---|---|---|---|---|
| 3,374,992 | A * | 3/1968 | Greer | B01J 19/32 261/112.2 |
| 3,374,993 | A | 3/1968 | Greer | |
| 3,982,981 | A * | 9/1976 | Takao | B01D 46/00 156/205 |
| 3,994,999 | A | 11/1976 | Phelps | |
| 4,374,071 | A | 2/1983 | Regehr | |
| 4,460,388 | A * | 7/1984 | Fukami | F24F 13/30 165/166 |
| 4,616,695 | A * | 10/1986 | Takahashi | F28D 9/0068 165/166 |
| 5,124,087 | A | 6/1992 | Bradley et al. | |
| 5,413,872 | A * | 5/1995 | Faigle | B01F 5/0643 165/166 |

(Continued)

*Primary Examiner* — Charles Bushey
(74) *Attorney, Agent, or Firm* — Whiteford, Taylor & Preston, LLP; Peter J. Davis

(57) ABSTRACT

Cooling towers and cooling tower fill configured for the cooling of process water with air by indirect heat exchange, in which the fill is configured with a first set of channels and a second set of channels, said first and second set of channels interleaved with one-another so that heat exchange occurs across material separating said channels from one-another.

4 Claims, 33 Drawing Sheets

(56) References Cited

U.S. PATENT DOCUMENTS

| | | | | |
|---|---|---|---|---|
| 5,722,258 A | * | 3/1998 | Aitken | B01D 3/16 |
| | | | | 196/100 |
| 7,168,482 B2 | * | 1/2007 | Lee | F24F 3/147 |
| | | | | 165/166 |
| 7,309,062 B2 | * | 12/2007 | Lin | F24F 3/1417 |
| | | | | 261/112.2 |
| 8,298,412 B2 | * | 10/2012 | Nieuwoudt | B01J 19/32 |
| | | | | 165/164 |
| 8,690,130 B2 | * | 4/2014 | Kulick, III | B01J 19/32 |
| | | | | 261/112.2 |
| 8,790,454 B2 | * | 7/2014 | Lee | F28D 3/02 |
| | | | | 165/166 |
| 2006/0001182 A1 | | 1/2006 | Kinney, Jr. et al. | |
| 2007/0040290 A1 | * | 2/2007 | Lin | F24F 3/1411 |
| | | | | 261/154 |
| 2013/0168881 A1 | * | 7/2013 | Libert | F28F 25/087 |
| | | | | 261/112.2 |

* cited by examiner

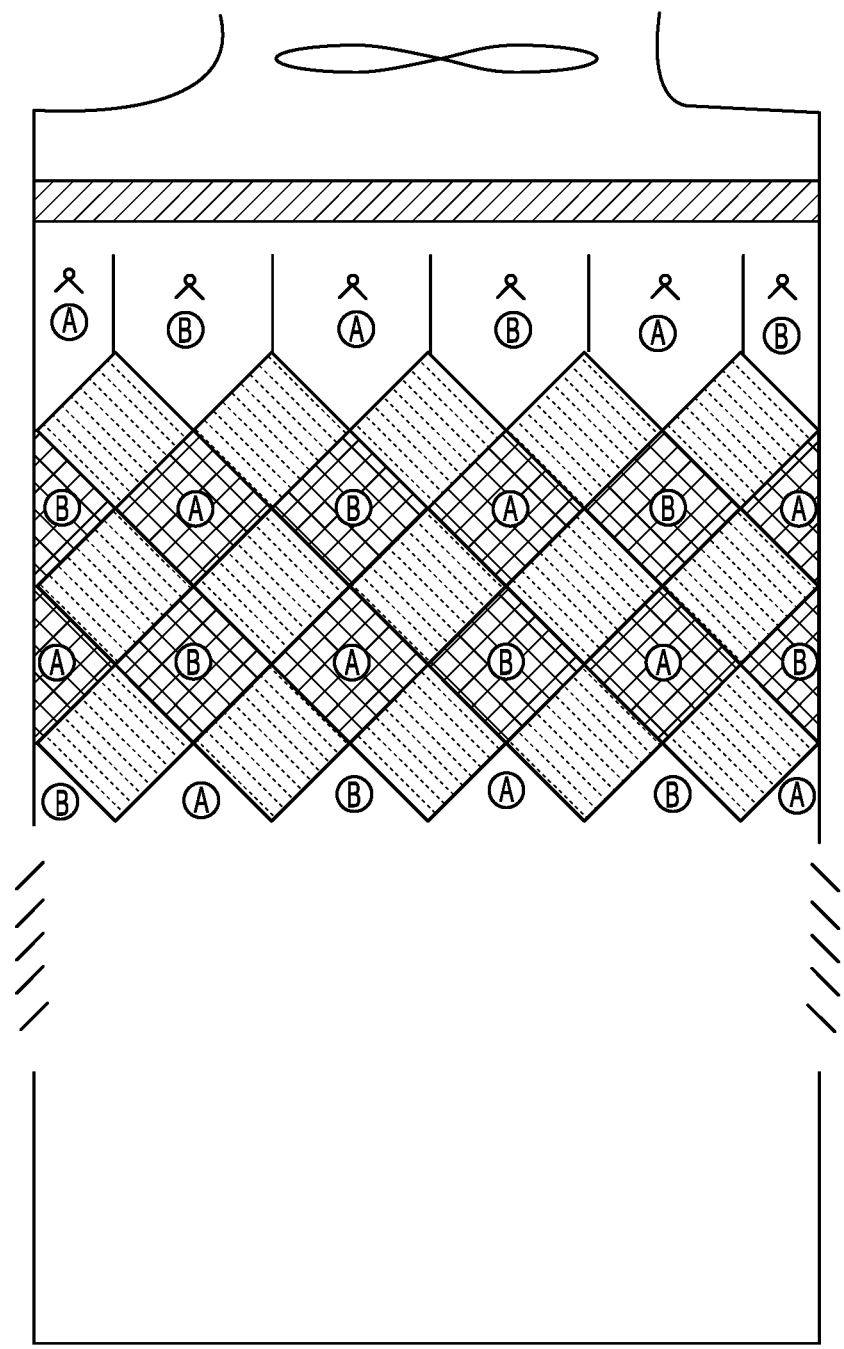
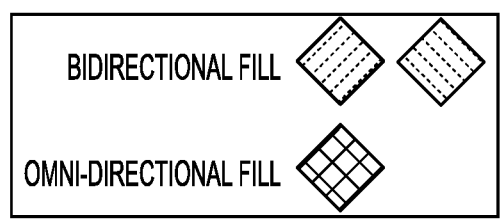
FIG. 5

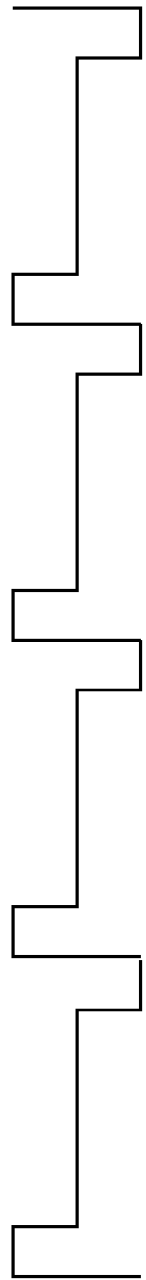

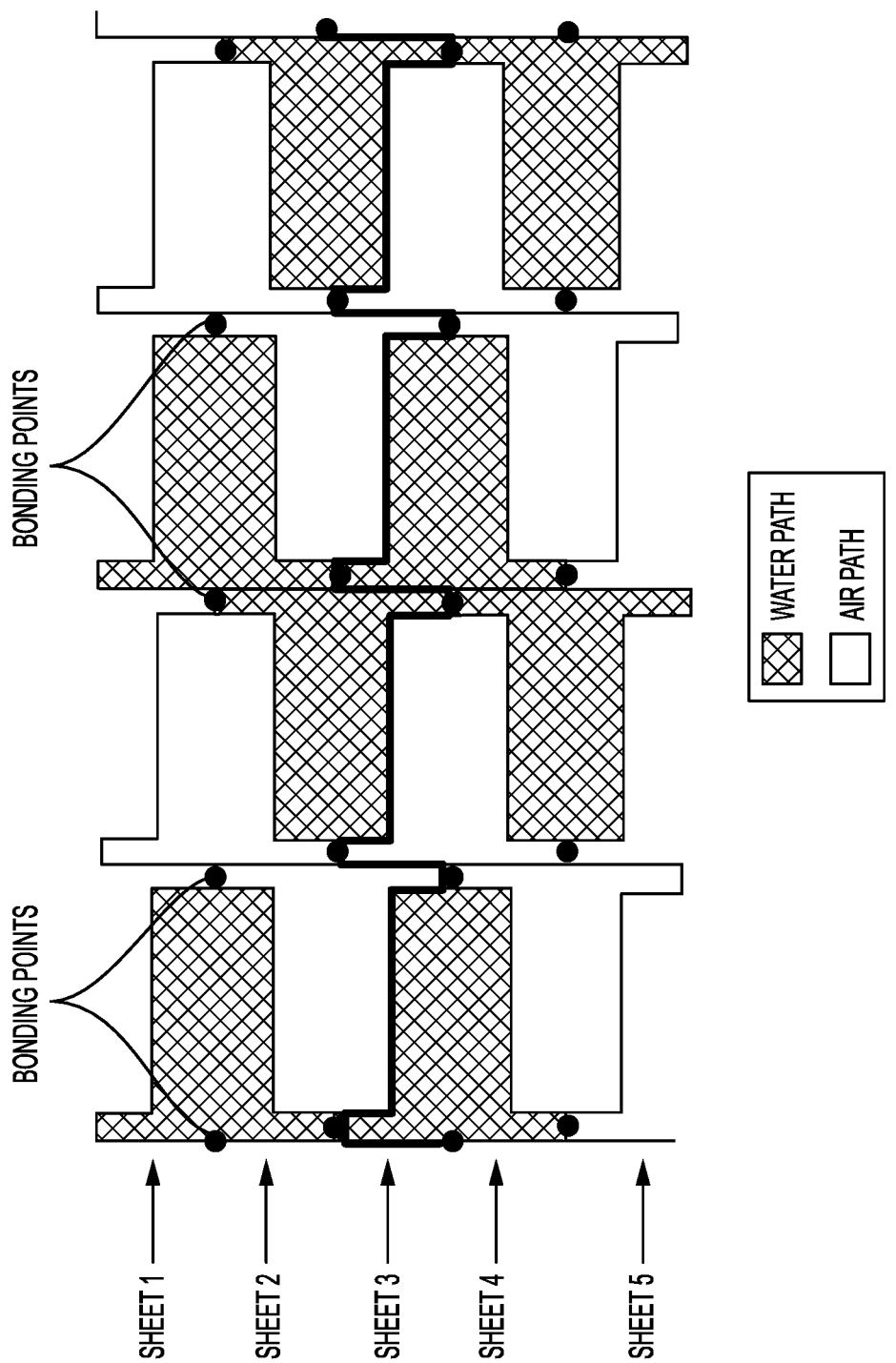

14 SECONDARY
SPRAY BRANCHES
FOR A 36'X36'
CELL-

| A |
| W |
| A |
| W |

4'X1' FILL
PACK WITH
4 COLUMNS

FIG. 27

BI-DIRECTIONAL FILL FOR USE IN COOLING TOWERS

FIELD OF THE INVENTION

This invention relates to the use of bi-directional fill in cooling towers and methods of manufacturing fill.

SUMMARY OF THE INVENTION

There is provided according to an embodiment of the invention, a cooling tower including cooling tower fill arranged for the cooling of process water with air by indirect heat exchange, in which the fill is configured with a first set of channels and a second set of channels, said first and second set of channels interleaved with one-another so that heat exchange occurs across material separating said channels from one-another.

According to a further embodiment of the invention, a first set of spray heads is configured to direct said process water only to said first set of channels, and a second set of spray heads is configured to direct said process water only to said second set of channels or to both sets of channels.

According to a further embodiment of the invention, the cooling tower is configured to allow indirect heat exchange between process water in said first set of channels and air in said second set of channels when said first set of spray heads is open, permitting process water to flow through said first set of channels, and said second set of spray heads is closed.

According to a further embodiment of the invention, said first set of channels are vertical from a top of said fill to a bottom of said fill, and wherein said second set of channels shift one column width at a top section of said fill, are vertical through a middle section of said fill, and optionally shift back one column width at a bottom section of said fill.

According to a further embodiment of the invention, said first set of channels shift one-half column width in a first direction at a top section of said fill, are vertical through a middle section of said fill, and optionally shift back one-half column width at a bottom section of said fill, and said second set of channels shift one-half column width in a second direction at said top section of said fill, are vertical through a middle section of said fill, and optionally shift back one-half column width at said bottom section of said fill.

According to a further embodiment of the invention, said channels are created by one or more fill packs, each made up of layers of stacked corrugated sheets, each corrugated sheet having a longitudinal axis that is shifted 30° to 90° relative to a longitudinal axis of adjacent corrugated sheets, each corrugated sheet separated from an adjacent corrugated sheet by an intermediate sheet.

According to a further embodiment of the invention, said corrugated sheets are bonded to adjacent intermediate sheets along corrugation ridges of said corrugated sheets.

According to a further embodiment of the invention, said first set of channels are oriented at an angle of 45° relative to vertical, and said second set of channels are also oriented at an angle of 45° relative to vertical, but perpendicular to said first set of channels.

According to a further embodiment of the invention, said fill packs have a length and width that are approximately equal.

According to a further embodiment of the invention, said fill packs have a length and a width, and wherein the length of said fill packs is 1.5 to 3 times the width.

According to a further embodiment of the invention, said fill packs are arranged in a plurality of layers across said cooling tower, According to a further embodiment of the invention, there are open areas between said fill packs.

According to a further embodiment of the invention, omnidirectional fill is arranged in the spaces between said fill packs.

According to a further embodiment of the invention, each of said stacked corrugated and intermediate sheets of said fill packs extend across a plurality of indirect heat exchange zones of said cooling tower.

According to a further embodiment of the invention, internal intermediate sheets have beveled corners to allow fluid or air communication to isolated areas of said fill pack.

According to a further embodiment of the invention, a plurality of fill packs may be stacked on top of one-another in said cooling tower, and each said fill pack may be oriented 180°, horizontally, relative to a fill pack immediately above and/or below.

According to a further embodiment of the invention, said first and second sets of channels have the same dimensions.

According to a further embodiment of the invention, said first set of channels is larger in cross-section than said second set of channels.

According to a further embodiment of the invention, there is provided a cooling tower fill pack having a stack of identical plastic sheets, each sheet having a first face and a second face, said first face having a first set of ridges that define a first set of channels, said second face having a second set of ridges that define a second set of channels, and wherein in said fill pack, said plastic sheets are stacked so that a first face of a first sheet, is mated with a first face of a second sheet, turned upside down, and a second face of said second sheet is mated with a second face of a third sheet, turned upside down relative to said second sheet.

According to a further embodiment of the invention, said plastic sheets comprise crenellated portions where at top and bottom sections where said channel-defining-ridges terminate.

DESCRIPTION OF THE DRAWINGS

FIG. 5 is an elevational view of a cooling tower fill section including bi-directional fill packs as in FIG. 2, but in which the open areas of FIG. 2 contain omnidirectional fill.

FIG. 14A is a cross sectional view along line A-A of FIG. 11.

FIG. 14B is a cross-sectional view along line A-A of FIG. 10.

FIG. 27 is a representation of a water distribution according to an embodiment of the present invention.

DETAILED DESCRIPTION OF THE INVENTION

The present invention is an apparatus and method to reduce water usage on an open cooling tower. Cooling towers cool water predominately by evaporation. The present invention provides a cooling tower that uses less water over the course of a year while cooling to the same temperature by replacing standard fill with bi-directional fill. The bi-directional fill provides two interleaved and independent air-water paths through the fill. The present invention also provides embodiments in which the fill includes multiple vertical interleaved water and air flow paths, allowing for concurrent or countercurrent indirect heat exchange in the fill section of a cooling tower.

Figure 1:
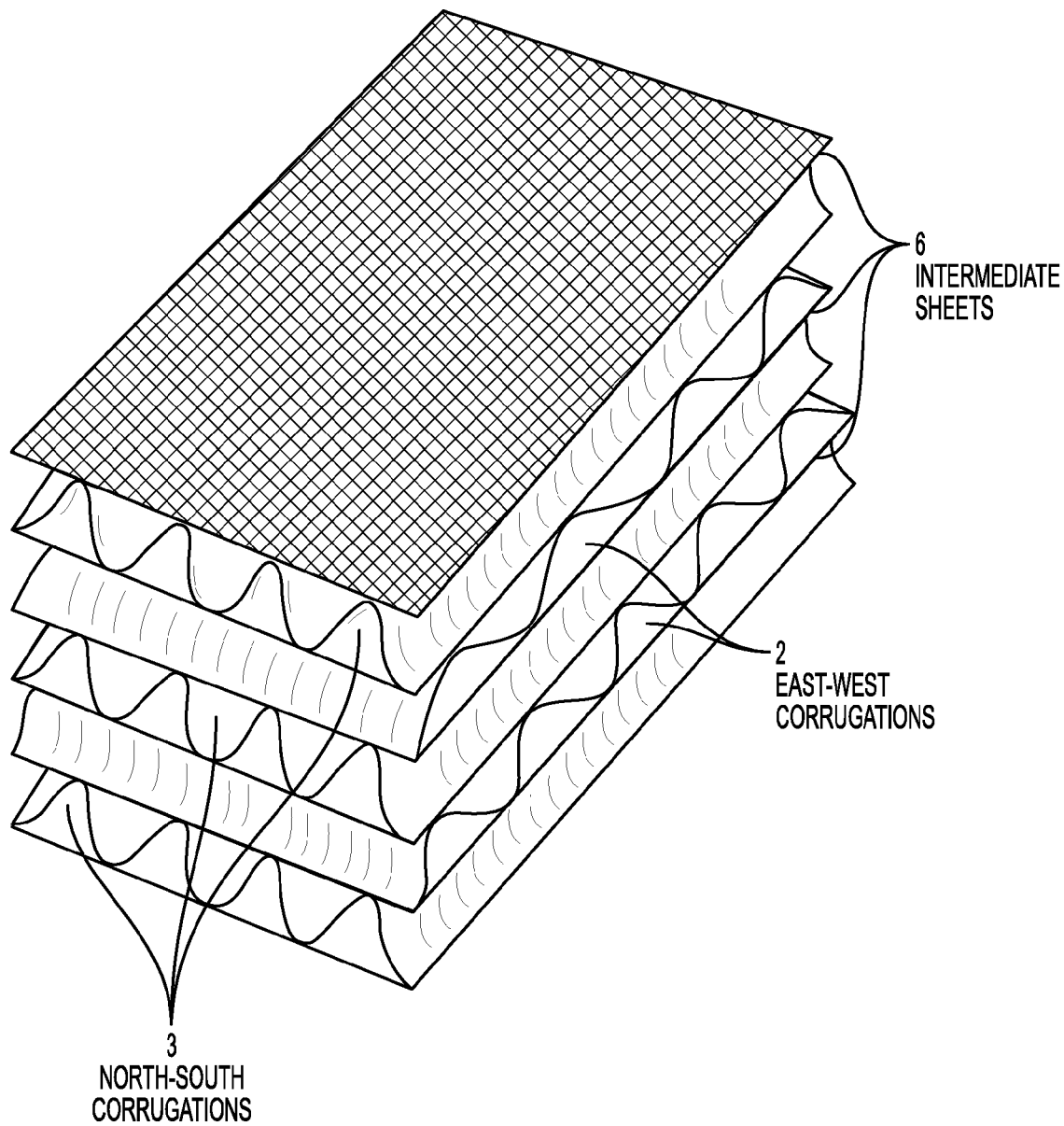
FIG. 1 is a perspective representation of a bi-directional fill pack which may be used according to the invention.

An individual bi-directional fill-pack according to a first embodiment of the invention is illustrated in FIG. 1. The fill-pack consists of multiple sheets of PVC arranged in a particular pattern. Corrugated sheets of PVC are alternated with corrugations perpendicular to each other; and thin intermediate sheets are placed in between the corrugated sheets. In this arrangement, one half of the corrugated sheets have corrugations that allow flow only in a first direction, e.g. a north-south direction, while the interleaved corrugated sheets have corrugations that allow flow only in a perpendicular direction, e.g., an east-west direction.

Figure 2A:
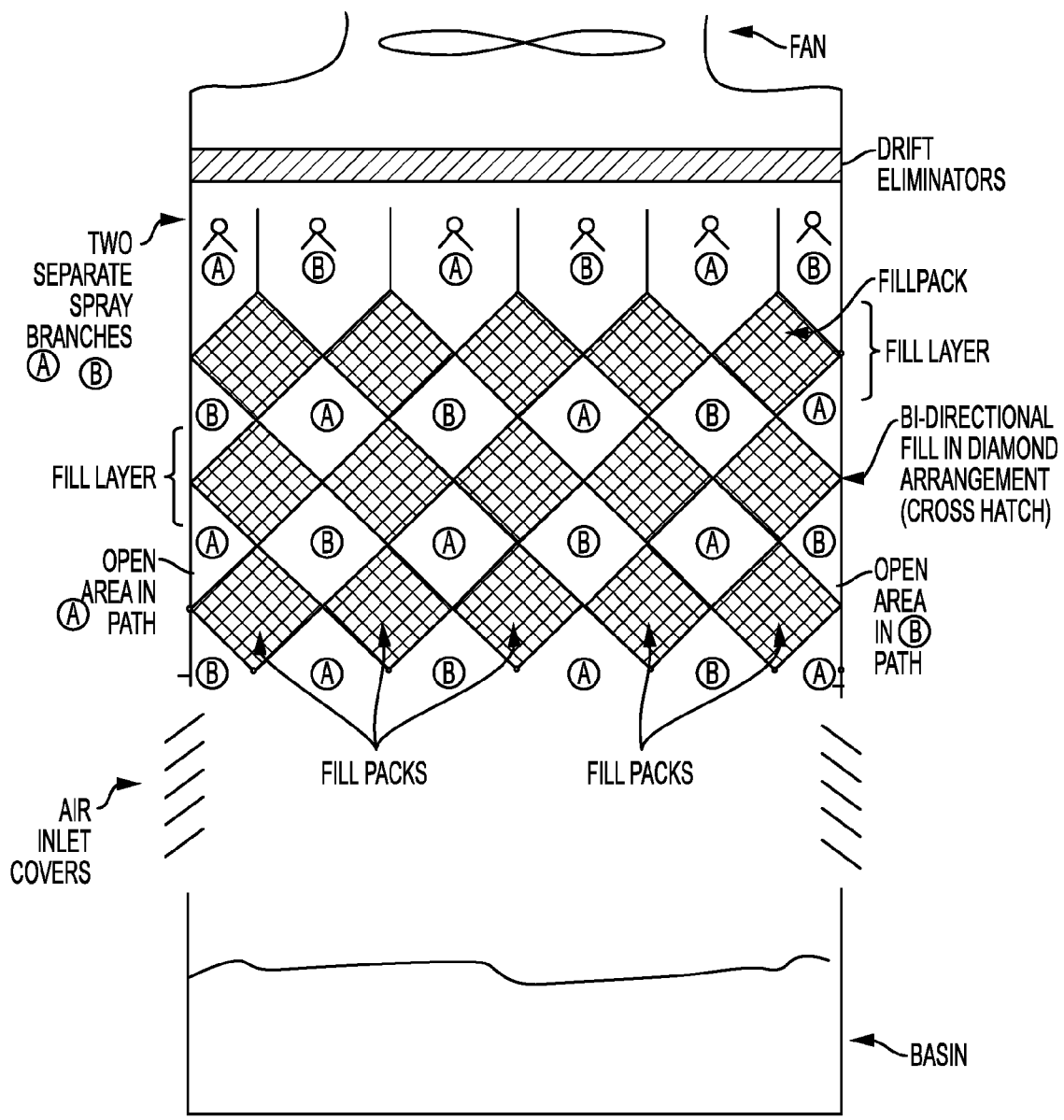
FIG. 2A is an elevational view of a cooling tower fill section including bi-directional fill packs according to the invention, showing three layers of fill packs arranged in a diamond configuration.
Figure 2B:
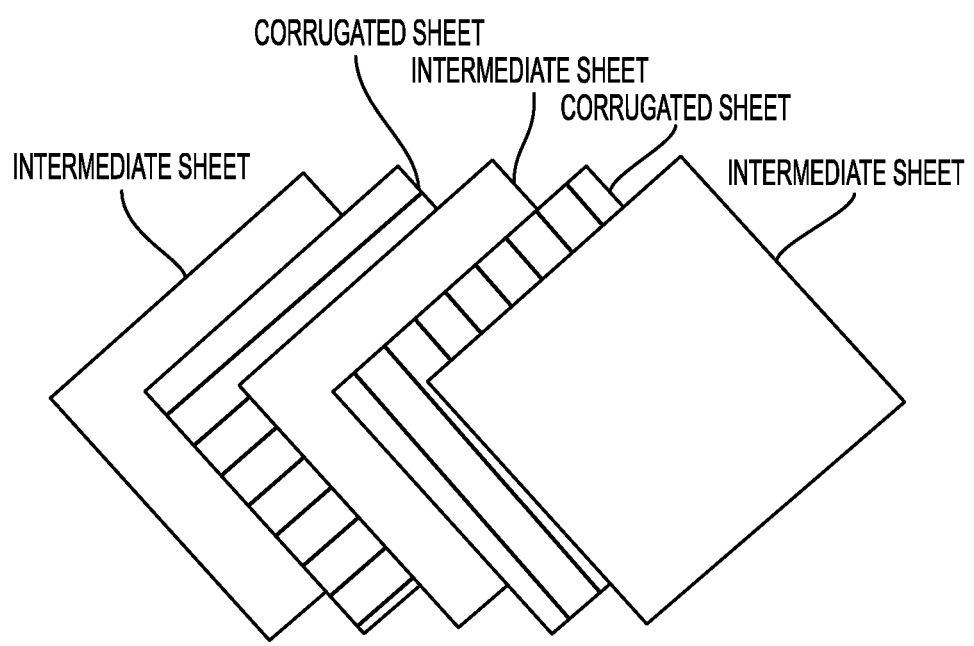
FIG. 2B is a partially exploded view of a single fill pack of FIG. 2A in the diamond configuration.

According to a further embodiment of the invention, bi-directional fill-packs may be oriented in a cooling tower fill section in a diamond configuration as shown in FIG. 2A, that is, with a first set of corrugations running in a first diagonal direction, e.g., Northwest to Southeast, and with the second, interleaved, set of corrugations running in a second, perpendicular, direction, e.g., Northeast to Southwest. According to this arrangement, the cooling tower can be configured to run as either a direct or as an indirect heat exchanger. FIG. 2B shows a partially exploded view of the fill packs of FIG. 2A. In the embodiment of FIG. 2A, three levels of fill packs are shown, with five fill packs per level but fewer or more levels or fill packs per level, may be used. According to the view shown in FIG. 2A, each fill pack extends into the page. The fill packs may contain five interleaved and perpendicularly arranged corrugated sheets, as shown in FIG. 1, or they may contain fewer or many more interleaved and perpendicularly arranged corrugated sheets. Open areas (not containing fill) exist in the spaces between the fill packs. Spray heads may be arranged above the fill packs to optionally direct water into channels A and B created by the corrugations. According to a preferred embodiment, the spray heads are divided among two spray branches A and B, corresponding to channels A and B. According to the embodiment shown in FIG. 2A, both sets of spray heads A and B may provide water to the fill section, or only one or the other set of spray heads may provide water to the fill section.

Figure 3B:
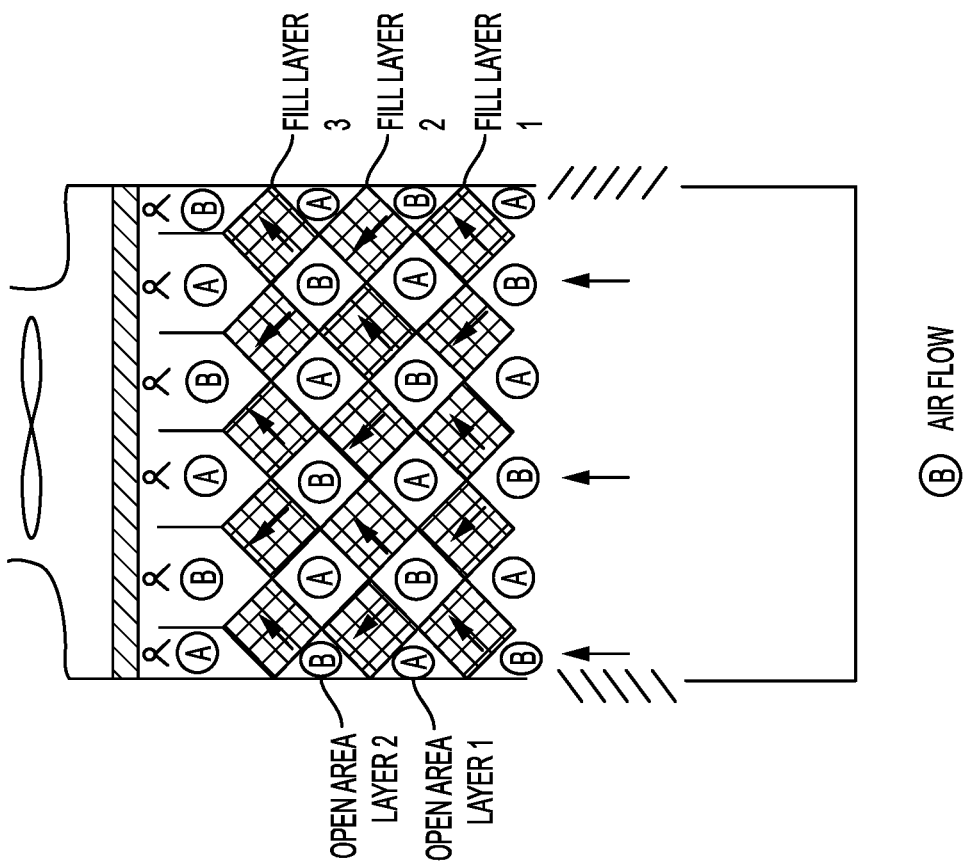
FIG. 3B is a representation of the cooling tower fill section of FIG. 2, showing the flow of air when only the A set of spray heads are providing water, and the fan is drawing air up through the fill section in a counterflow configuration.
Figure 3A:
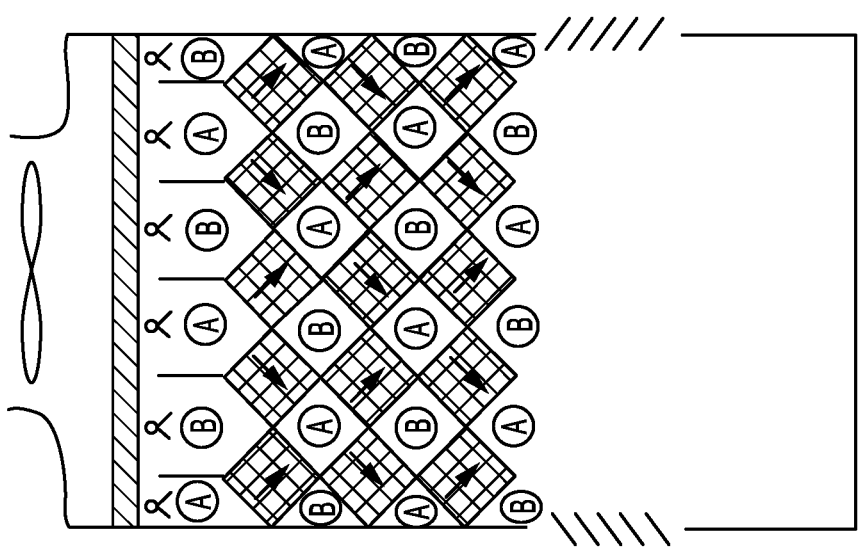
FIG. 3A is a representation of the cooling tower fill section of FIG. 2, showing the flow of water when only the A set of spray heads are providing water.

Referring to FIG. 3A, in case of only the A spray heads providing water, water will only flow in the A channels of the fill packs, following the paths shown by the arrows in FIG. 3A. With water filling the A channels as shown in FIG. 3A and spray heads B turned off, the air drawn into the fill section by the fan will follow the paths of least resistance, that is, through the B Channels. Thus, referring to FIG. 3B, air flowing up from the central bottom will predominantly flow through the B channels to the open areas in open-area layer 1 that are labeled as 'B' and then to the four open areas in open-area layer 2 that are also labeled with a 'B'. The air will finally exit below one of the spray branches labeled 'B'. Once airflow starts out in a 'B' channel it will stay in that 'B' channel until it exits the fill-pack, never flowing through the 'A' path. Due to the arrangement of the interleaved perpendicularly oriented corrugated sheets in the fill packs, the 'A' and 'B' paths are completely separate paths through the fill pack.

According to the arrangement shown in FIG. 2A, then, the cooling tower can be run in 3 different configurations.

According to a first configuration, if the water is allowed to flow equally through both spray branches, the tower will act as a standard counterflow direct-cooling cooling tower. Water will flow down through both A and B channels, and air will flow up through both A and B channels, drawn by the fan. The airflow and water flow in each of the channels will be equal.

According to a second configuration, when the ambient dry bulb is cool, the tower may be run in an indirect cooling mode. In the indirect cooling mode, all of the water may be caused to flow through channel 'A' channels, and no water will flow through channel 'B' channels. In this mode there is double the design water flow going through 'A' channels which increases the resistance of air trying to flow up channel 'A' channels. With no water flowing through 'B' channels, the resistance of air trying to flow up 'B' channels will be reduced. The result of this water flow arrangement is that more of the air will now flow in the dry channels with less flowing in the flooded channels.

Since the A and B channels are interleaved, the open cooling tower will now be mostly an indirect heat exchanger, as the warm water flowing down the 'A' channels will be cooled by the cool air flowing up the 'B' channels. While there will still be some evaporation occurring in the 'A' channels, as not all of the air will be directed to the 'B' channels, there will be significantly less evaporation than with a standard tower.

According to a third configuration, when the ambient dry-bulb is too high to allow operation in the fully indirect mode, a partially indirect mode may be used. In this third configuration some water would be directed to the 'B' channels via the B spray heads. By sending some water through the 'B' channels and reducing the overfeeding of water to the 'A' channels, there will be some evaporative cooling; however this arrangement may allow more latent cooling of the recirculating water than would occur with an standard evaporative tower under the same conditions.

For multi-cell units in ambient conditions where operating in the dry mode provides insufficient cooling, some cells could be run dry while others wet. The wet section would cool the water below the setpoint to compensate for the dry section's inability to reach the required cold-water temperature. The average temperature of the wet and dry section would meet the required cold-water temperature and some dry cooling would still be performed. Likewise a single cell could also be run in a partially-dry mode by sending some of the hot water in one area of the cell through the standard spray system while the balance is dry-cooled in other areas of the tower.

Figure 3C:
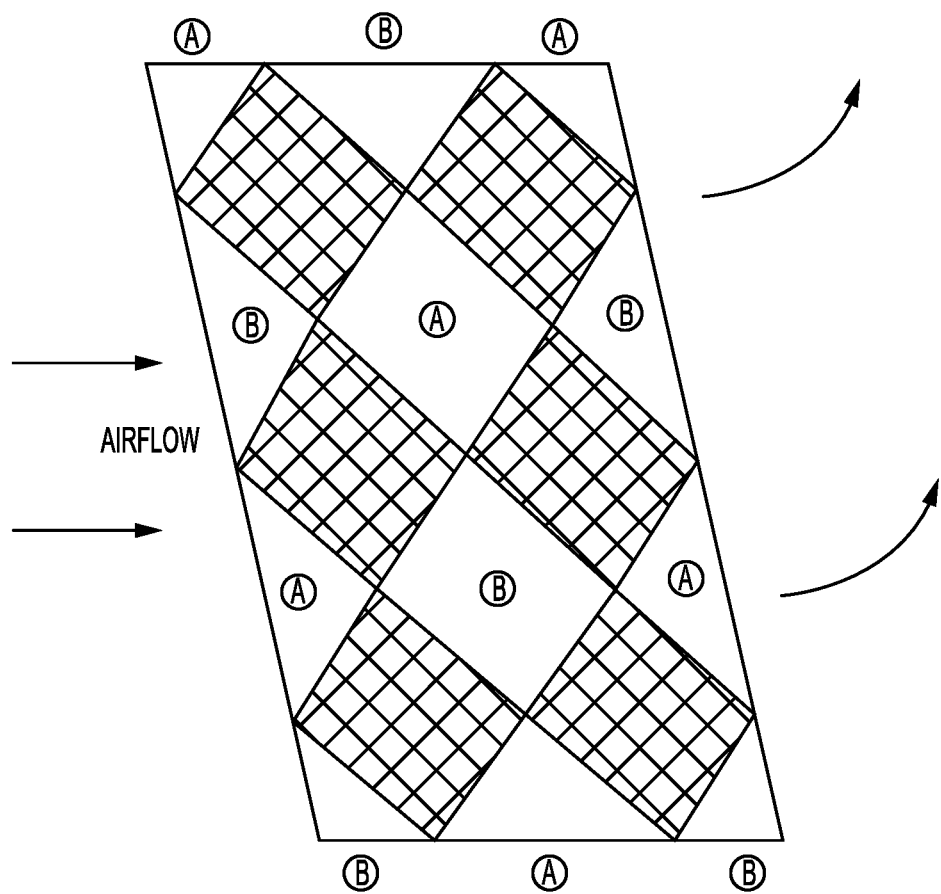
FIG. 3C illustrates how an embodiment of the invention can be applied to a crossflow cooling tower.

This invention is not limited to counterflow-cooling towers. FIG. 3C illustrates how an embodiment of the invention can be applied to a crossflow cooling tower. In this example the 'B' channel could be the water channel. In the dry mode water would only pass into 'B' channels. The crosshatched areas are indirect heat exchangers. A person having ordinary skill in the art would be able to easily apply the variations of the invention previously illustrated for counterflow cooling towers to crossflow cooling towers.

Figure 4:
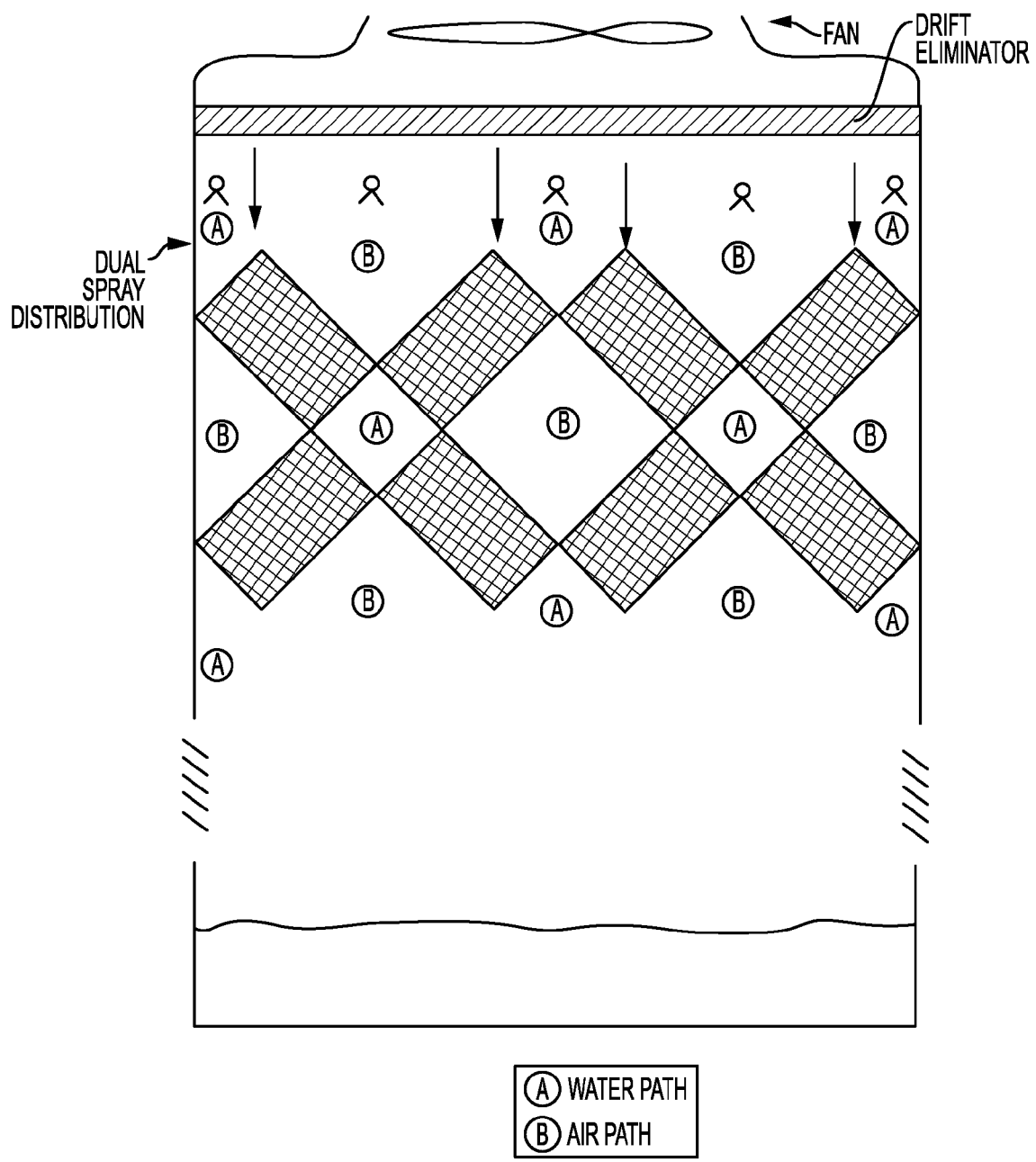
FIG. 4 is an elevational view of a cooling tower fill section including bi-directional fill packs according to a further embodiment of the invention, in which the fill packs are elongated in one dimension, showing two layers of fill packs arranged in a diamond configuration.

The configurations of the channels do not have to be identical. Since channel 'A' will always contain water, a more tortuous channel path/configuration may yield improved heat transfer. Also the bi-directional fill need not be made square. FIG. 4 illustrates a bi-directional fill with a 2:1 aspect ratio, in which the length of one set of corrugations is twice the length of the corrugations in the perpendicular direction. According to the embodiment shown in FIG. 4, the corrugated sheets with corrugations aligned in the NW to SE direction are twice as long as the corrugated sheets with corrugations aligned in the NE to SW direction (when length of the sheet is measured in the direction parallel to the corrugations), and the A channels are twice as long as the B channels. Additionally, the channel entry and exit zones will increase or decrease correspondingly. As can be seen from FIG. 4, the channel A entry, exit, and intermediate zones are significantly smaller than channel B entry, exit and intermediate zones. According to a preferred aspect of this embodiment, Path 'A' would be the water path. In the dry mode very little air would go through 'A'. While this arrangement may have airflow and other benefits it will have less cross-sectional dry cooling per unit of height as compared to an arrangement with equal zone widths. For example, with fill packs having perpendicularly arranged corrugated sheets of equal length (a 1:1 aspect ratio) the area of indirect heat transfer is 50%, see FIGS. 2A and 5. Even when the orientation of corrugations of interleaved sheets are shifted from perpendicular (90°), e.g., FIGS. 2A and 5, to a narrower/taller diamond, in which the angles between interleaved corrugated sheets is 60°/30°, the area of indirect transfer is still 50%, provided that the length of the interleaved corrugated sheets are equal, e.g., FIG. 6. By comparison, the fill packs of FIG. 4 cover less than 50% of the cross-sectional area of the fill area.

According to a further embodiment of the invention, the open areas shown in FIGS. 2-4 do not need to be open but can be filled with omni-directional fill; see FIG. 5. This standard fill would serve as extra direct heat-exchanger surface area when the tower was operated in a fully evaporative mode, i.e., in which both spray heads A and B were providing water to the fill area, and water was flowing through both channels A and B. In the dry mode there would be no cooling in the omni-directional fill as either water or air but not both will pass through that area fill. With the open areas filled in with omnidirectional fill, the tower will have very similar evaporative cooling capability as a similar evaporative tower with the same fill volume and horsepower fan.

Figure 6:
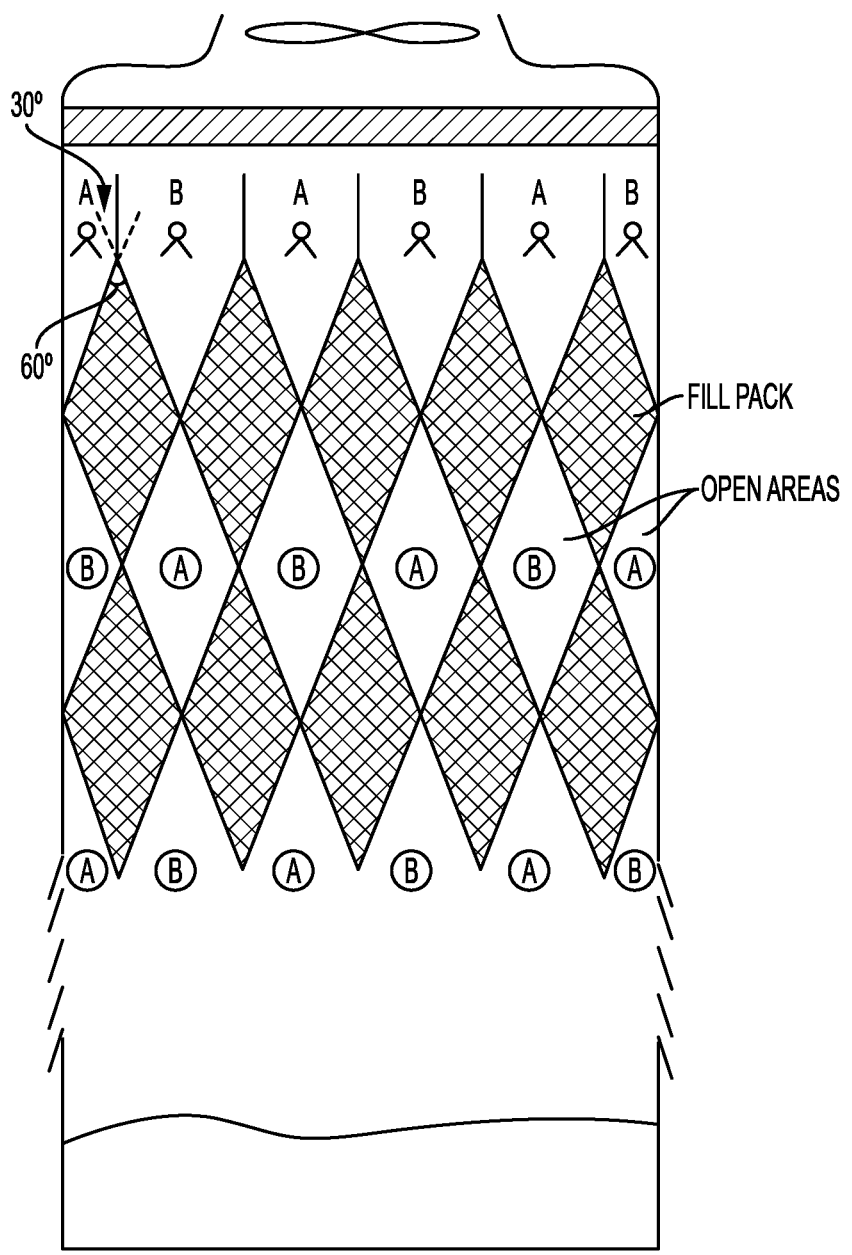
FIG. 6 is an elevational view of a cooling tower fill section two layers of bi-directional fill packs in which the fill packs are oriented in a diamond configuration, and in which the fill packs are made from interleaved corrugated sheets that are arranged at 60°/30° angles relative to one-another.

The fill packs according to the invention may also be elongated, i.e., in which. FIG. 6 illustrates an example of a fill pack elongated in the vertical direction, i.e., in which the orientation of corrugations of interleaved sheets are shifted from perpendicular (90°) to 60°/30°. Such a configuration could improve water distribution and lower the pressure drop from air flowing up the fill. In all other respects, the embodiment of FIG. 6 operates the same as the embodiment of FIGS. 2 and 3.

Figure 7A:
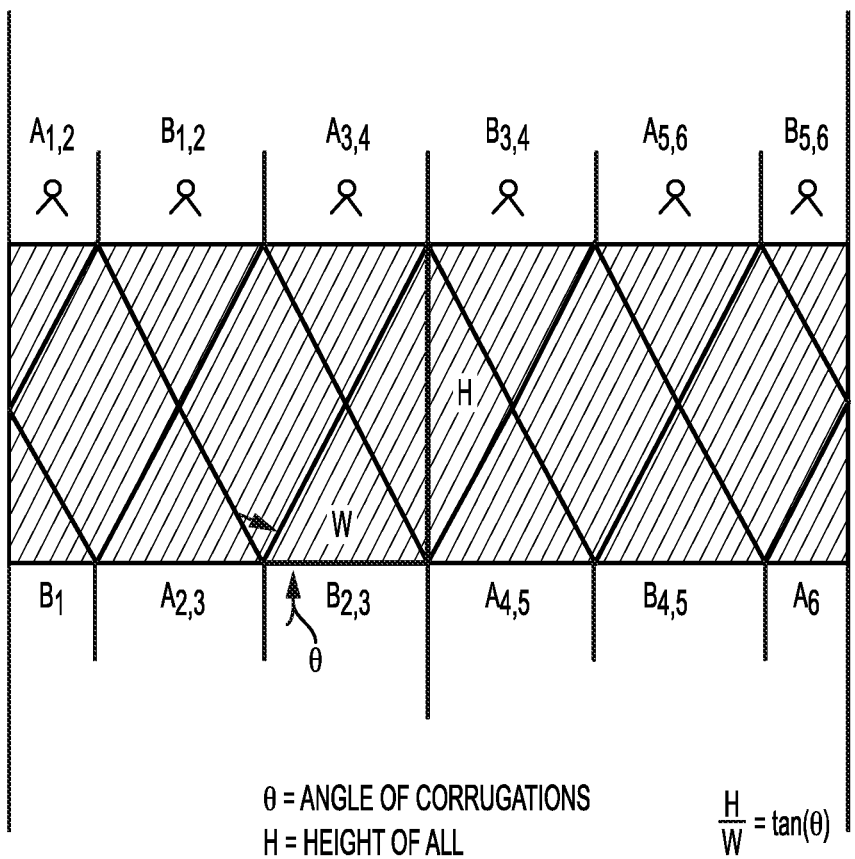
FIG. 7A is an elevational view of a single layer of fill in a cooling tower fill section, in which the layer of fill comprises a single fill pack that spans the length of multiple zones.
Figure 7B:
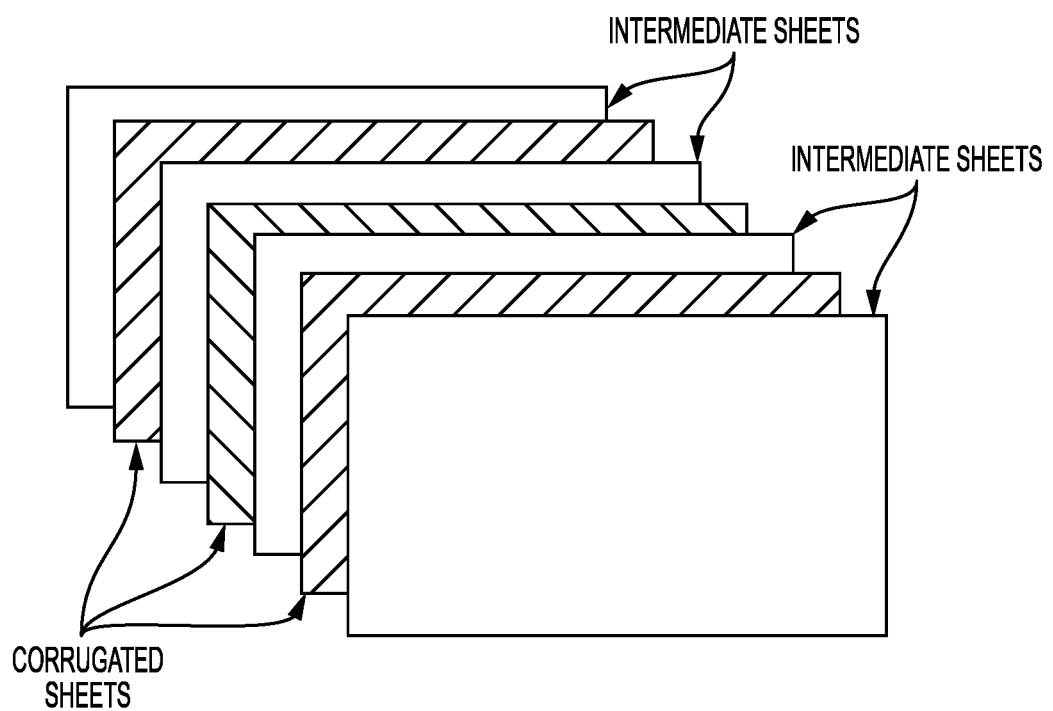
FIG. 7B is a partially exploded view of the fill-pack shown in FIG. 7A.

According to a further embodiment of the invention, illustrated in FIG. 7A the multiple fill packs in a single fill pack layer shown in FIGS. 2-6 may be replaced with a single fill pack made up of a first set of long sheets of fill, corrugated at an angle, alternating with a second set of long sheets of fill with corrugations that are perpendicular to, or at some other angle relative to, the corrugation of the first sheets, where the two sets of alternating corrugated sheets are separated by intermediate sheets. A partially exploded view of the fill pack of FIG. 7A is shown in FIG. 7B.

According to this embodiment of the invention, channels are formed between corrugated sheets and adjacent intermediate sheets such that water entering a channel stays in that channel until it exits the fill block. FIG. 7A illustrates one direction of the corrugations, and hence, of the channels. Not shown, is the direction of the second set of corrugations/channels that travel across the first set of corrugations (separated by the intermediate sheets, also not shown in FIG. 7A, The dark lines indicate the limits of each of zones $A_1$-$A_6$ and $B_1$-$B_6$. Zones with an odd subscript (i.e., $A_1$, $A_3$, $A_5$, $B_1$, $B_3$, $B_5$ go from right to left as the channels move down the fill pack, and the zones with even subscripts (i.e., $A_2$, $A_4$, $A_6$, $B_2$, $B_4$, $B_6$) go from left to right as the channels move down the fill pack. The diamond-shaped areas are areas of zone overlap. With both sets of spray nozzle on, this system will function as a typical direct heat exchanger. However, if air is going through one zone and water through the others, the diamond areas will act as indirect heat exchangers, cooling the water without evaporation. More specifically, if one half of the spray heads are closed, e.g., the B spray heads, and all of the water is flowing through the A spray heads into the A channels, the diamond areas of overlap will function as an indirect heat exchanger.

Figure 8A:
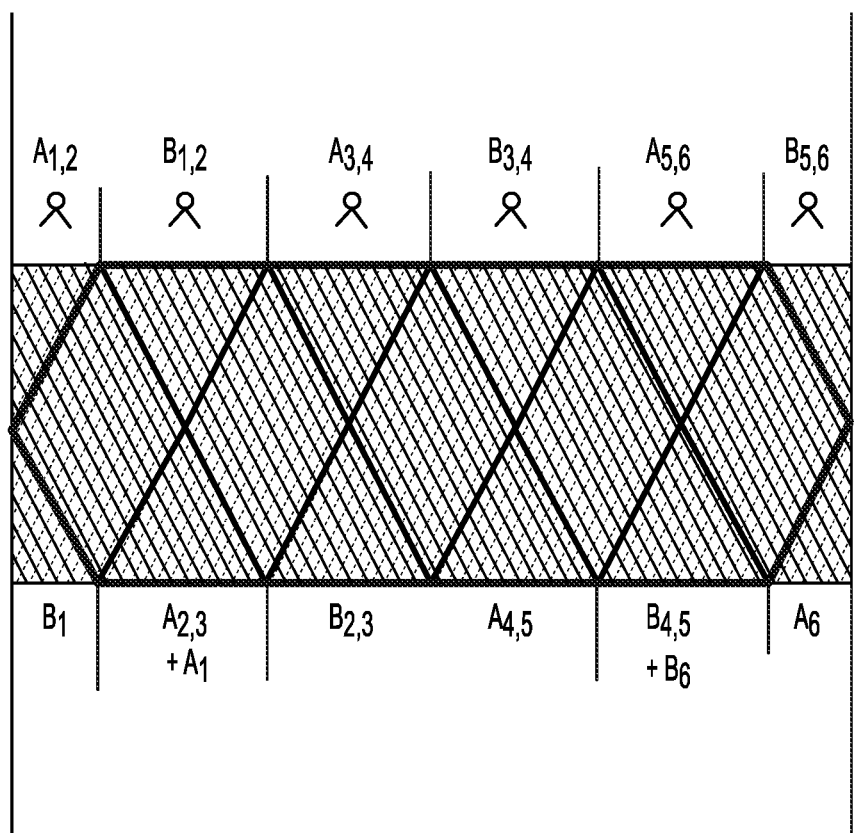
FIG. 8A is an elevational view of a single layer of fill in a cooling tower fill section according to a different embodiment of the invention, in which intermediate layers of intermediate sheets are truncated at the corners to open isolated zones at the top and bottom corners of the fill pack.
Figure 8B:
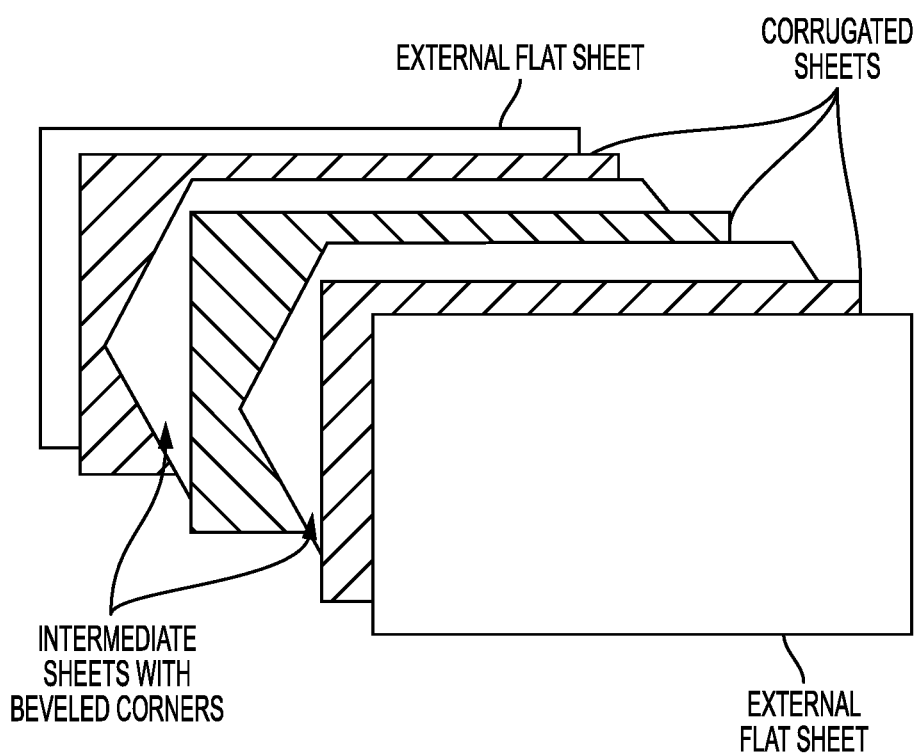
FIG. 8B is a partially exploded view of the fill-pack shown in FIG. 8A.

Note however, that according to the embodiment of FIG. 7A there is no exit for water entering zones $A_1$ or $B_6$, i.e., there are "dead areas" at the ends of the fill pack where the channels dead end into the side wall. This effect can be predominately alleviated by modifying the internal intermediate sheets as shown in FIG. 8A. When the corners of the internal intermediate sheets are removed/beveled as shown in FIG. 8A, the dead-areas of FIG. 7A become connected to open paths in the cross direction from the same zone that allows some water or air flow to occur. A partially exploded view of the fill pack of FIG. 8A is shown in FIG. 8B.

If the zones are of equal width, and if overlapping zones at the bottom exit of the fill column are to be avoided, the vertical height of the fill (H) divided by the width of the zones (W) must equal to the tangent of the angle of the corrugation (θ). This relationship is illustrated in FIG. 7A. If the fill height and zone width do not satisfy this relationship, then exit areas will receive flow from adjacent zones. The bottom layer of fill could be truncated so long as there was not additional bi-directional fill below it.

Figure 9A:
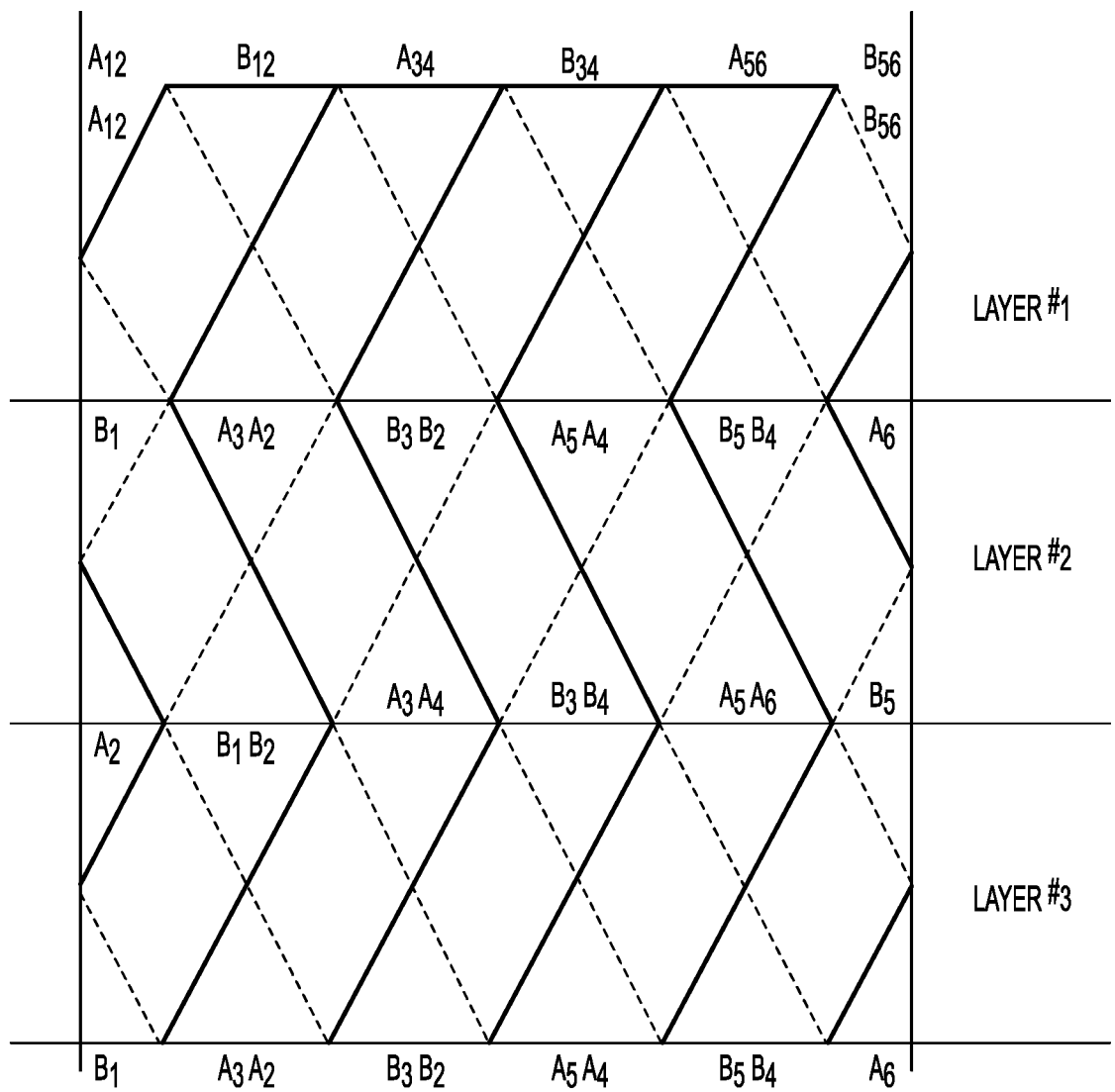
FIG. 9A is a elevational view of a fill section of a cooling tower in which the fill is comprised of three connected layers of fill pack, each layer having the same construction of adjacent layers, but in which each successive layer is rotated horizontally 180° relative to the prior layer.
Figure 9B:
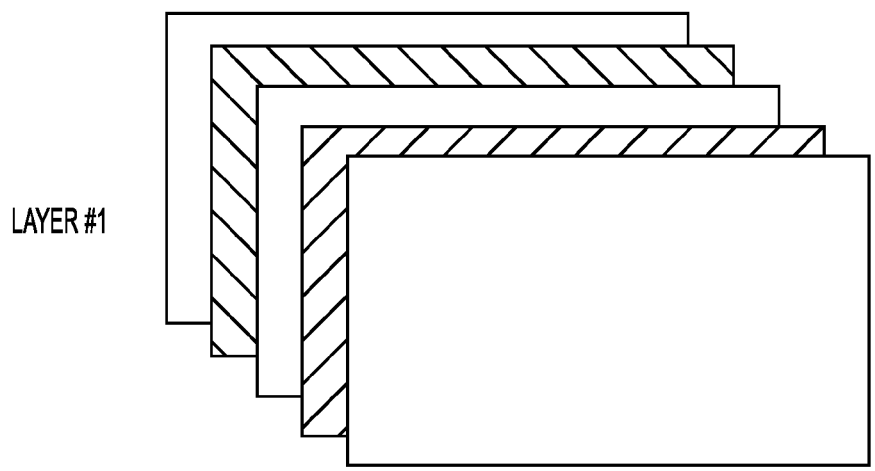
FIG. 9B is a partially exploded view of the first layer of the fill section of FIG. 9A.
Figure 9C:
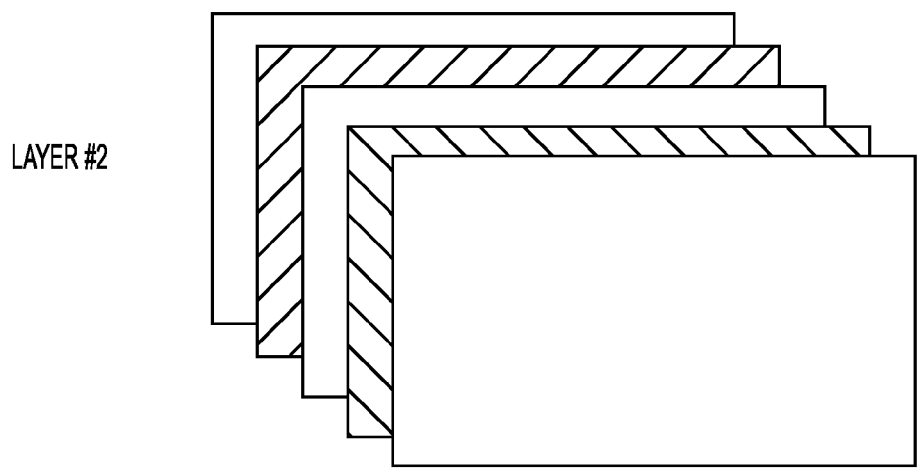
FIG. 9C is a partially exploded view of the second layer of the fill section of FIG. 9A.
Figure 9D:
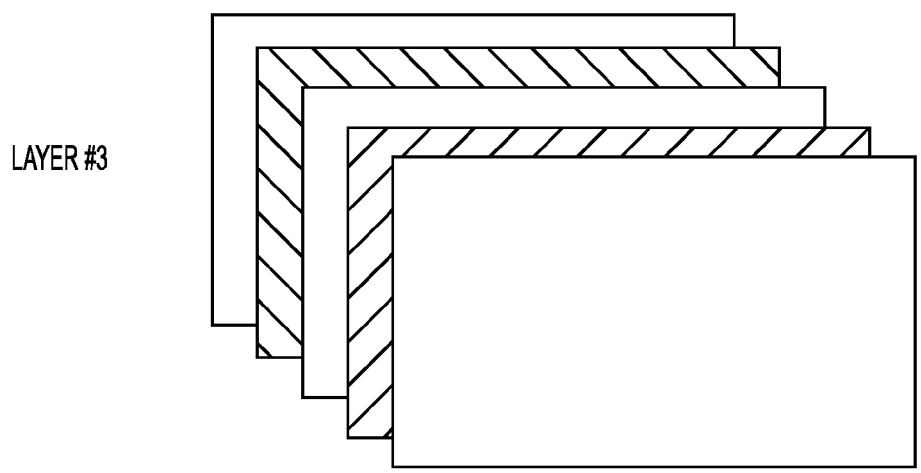
FIG. 9D is a partially exploded view of the third layer of the fill section of FIG. 9A.

Alternatively, the height to zone width ratio limitation can be avoided as shown in FIG. 9A, by stacking fill packs of the type shown in FIG. 7A on top of one-another, but reversing the angles of corrugation for each channel, e.g., by rotating the second layer fill pack 180° horizontally, relative to the fill pack of the first layer fill pack, and optionally adding additional layers of fill pack, reversing the orientation of each relative to the one above, so that the channels zig-zag down the fill column. Partially exploded views of the three layers of the fill pack of FIG. 9A are shown in FIGS. 9B, 9C and 9D. By using any number of zigs and zags, or "doglegs," the fill height can be made in multiples of the tan (θ)×W.

By sending all of the water through one set of paths in the fill and none of the water through the other, the resistance to airflow will be greater in the paths with the water. Under typical water-flow rates of 6 gpm per square foot, this greater air resistance will result in a split of airflow such that approximately 55% of the air will go through the dry path and 45% of the air will go through the wet path even when the paths have the same cross-sectional area. While this will lead to significant water use reduction for a tower, with many ambient conditions even more water could be saved if there were more than 55% of the air passing through the dry section.

Another embodiment of this invention has one of the paths designated as a "wet-path" and the other designated as a "dry-path". The wet-path would be narrowed down in cross-sectional area while the dry-path would be opened up. This will increase the resistance to air-flow in the wet-path and reduce it in the dry-path. By this change, a higher percentage of air than 55% will go through the dry-path. The percentage of air in the dry path can be adjusted by adjusting the cross-sectional areas of the two paths. This higher percentage will allow more water to be saved in many ambient conditions than the 45%65% split achieved with equal cross-sectional area paths.

Figure 10:
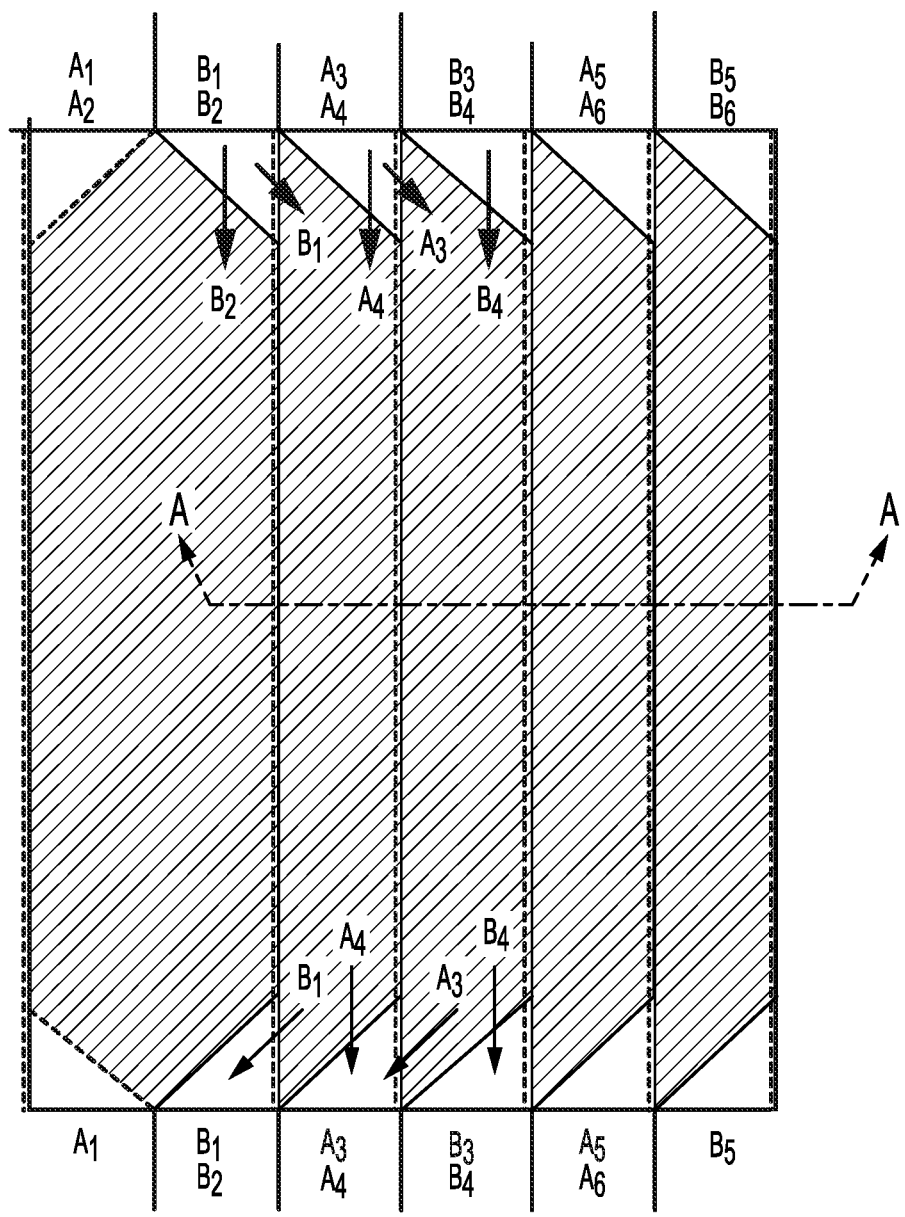
FIG. 10 is an elevational view of a cooling tower fill section having overlapping indirect heat exchange channels.

FIG. 10 illustrates another embodiment of the invention. According to this embodiment, the indirect heat exchanger covers more than 50% of the fill-pack area. As with prior embodiments, the embodiment represented by FIG. 10 may be constructed with alternating sheets (stacked into the page, from the view of FIG. 10), but in this embodiment, all the channels run vertically at the center of the fill column. Since the columns are vertical, the intermediate sheets of FIGS. 2-9 are not necessary (although they may still be used). Instead, the intermediate sheets of FIGS. 2-9 may be formed with ribs to separate each sheet from adjacent sheets thereby creating the channels. According to this embodiment, each internal sheet has one set of channels on a first side, and a second set of channels on an opposite side. One half of the channels are vertical from top to bottom. The other half of the channels shift to the right at the top of the column, in order to form overlapping water/air zones, and then optionally shift back to the left, so that the exit zones do not overlap. Zones denoted with odd subscripts, i.e., $A_1$, $A_3$, $A_5$, $B_1$, $B_3$, and $B_5$, denoted by solid lines, shift to the right at the top, then drop vertically, then optionally shift back to the left at the bottom of the column. Zones denoted with even subscripts, i.e., $A_2$, $A_4$, $A_6$, $B_2$, $B_4$ and $B_6$, denoted by dashed lines, and which reside in front of and behind the odd Zones, looking through the page, drop straight down the column from top to bottom.

Looking at a typical zone $B_3$/$B_4$, on the side represented by solid lines the $B_3$ doglegs right, flows straight down to the bottom of the pack then doglegs left to exit. On the side represented by dashed lines $B_4$ flow goes directly down and recombines with the $B_3$ flow at the exit. (Note this recombination is only to separate the air from the water exits to minimize aspiration of water into a dry channel and may not be necessary.) In the shaded areas behind the $B_4$ zone is $A_5$ and behind the $B_3$ zone is $A_4$. With water flowing through A and air only in B there will be an indirect heat exchanger. On the left edge of the fill pack, zone $A_1$ and $B_2$ are double width to eliminate an otherwise dead area opposite zone $A_2$ since there is no $B_0$ to flow behind it.

The standard-fill as illustrated results in individual channels running from top to bottom of the fill.

Figure 11:
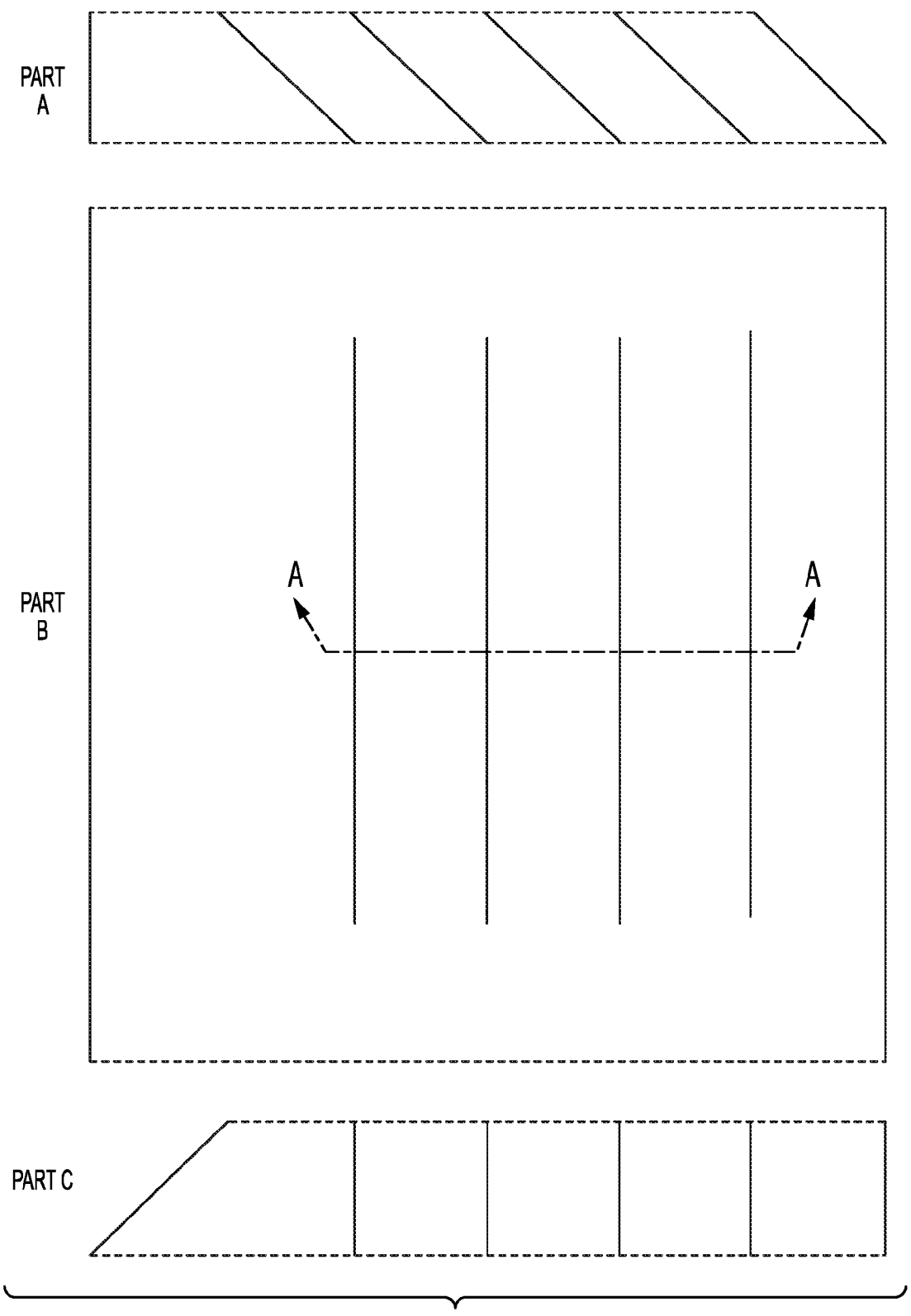
FIG. 11 is a representation of the three parts that may be used to assemble the sheets which in turn may be used to construct the fill pack shown in FIG. 10 without using a full intermediate sheet.
Figure 12:
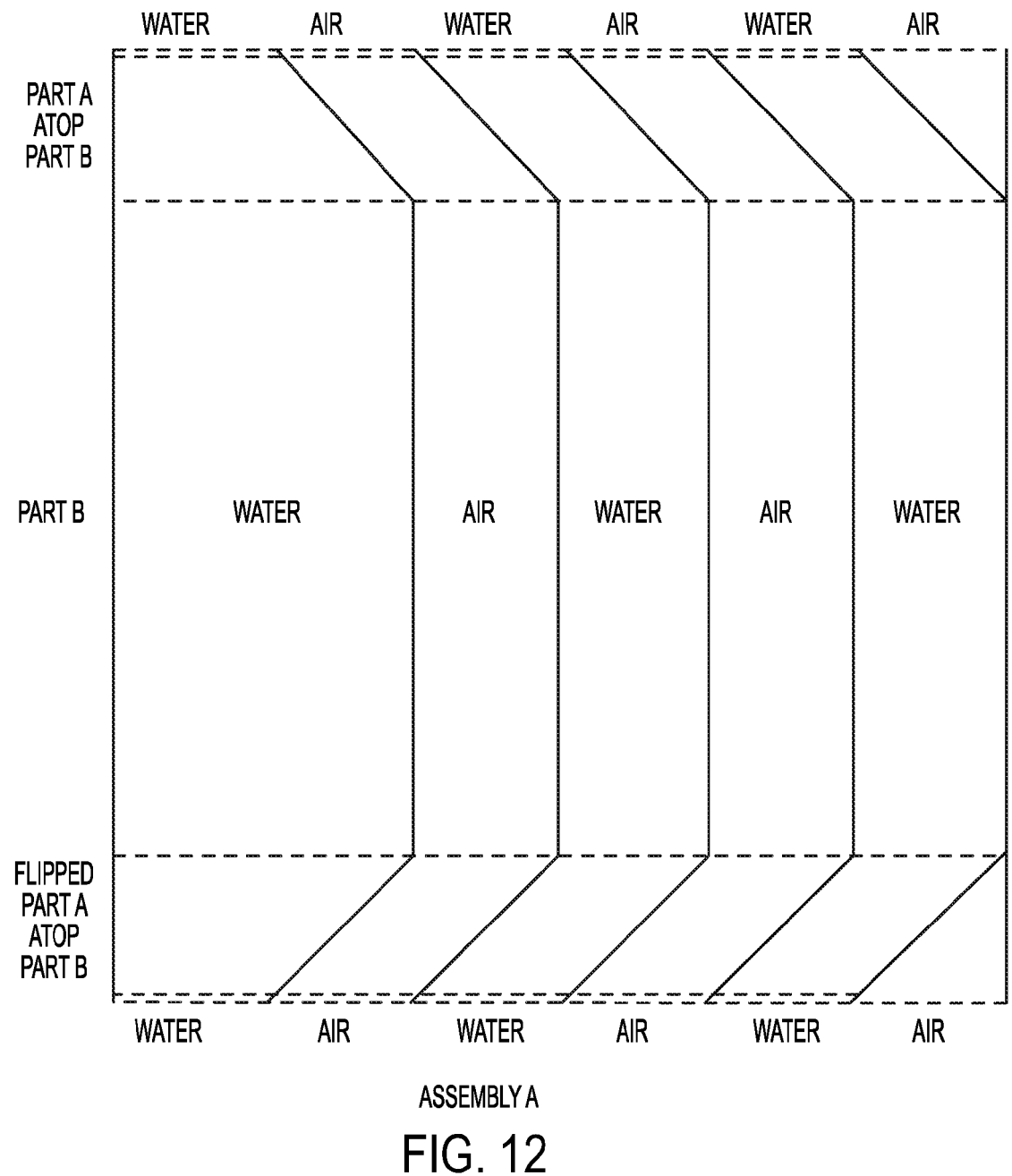
FIG. 12 is a representation of a first assembled sheet that may be used to construct the fill pack shown in FIG. 10.
Figure 13:
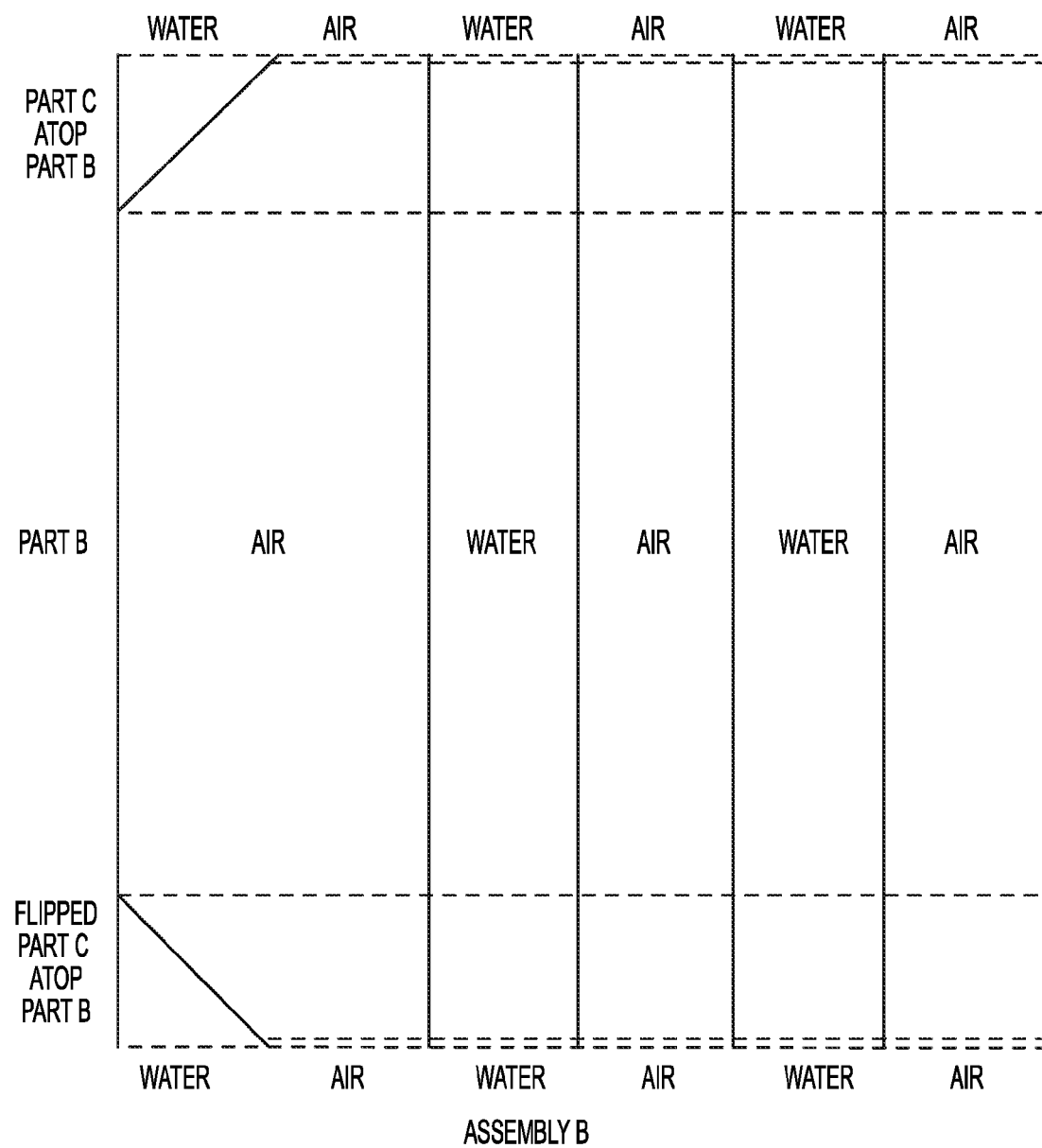
FIG. 13 is a representation of a second assembled sheet that may be used to construct the fill pack shown in FIG. 10, arranged in an alternating/interleaved sequence with the first assembled sheet shown in FIG. 12.

FIGS. 11-13 illustrate one way according to which the embodiment of FIG. 10 may be fabricated. FIG. 11 shows the parts that may be assembled to make the two sets of alternating sheets. FIG. 12 shows the assembly of parts to make assembly A, a first set of sheets, and FIG. 13 shows the assembly of parts to make assembly B, a second set of sheets. The solid lines represent ridged/ribbed bonding surfaces where the sheets are bonded to one another to create the channels; the dashed lines indicate an end of the part, which is bonded to a part of the same sheet to create an assembled sheet. Each rib/ridge on the front side of parts A, B, and C, has a corresponding rib/ridge on the reverse side. A cross-sectional view of Part B is shown in FIG. 13A. These three different parts are assembled as shown in FIGS. 12 and 13.

In assembly A, Part 'A' is attached atop Part 'B' as shown. Going from top to bottom Part 'A' will, in general, index over one column to the right. At the bottom of the assembly Part 'A' is flipped 180° horizontally and will index over one column to the left effectively returning the output of the column to below its original input. The leftmost column becomes a double column due to the edge effect of the fill-pack. The center of the sheet identifies if a column carries water or air. As illustrated in, the columns in assembly A alternate between water and air with the left-most column being a water column.

In assembly B, Part 'C' is attached atop Part 'B' as shown in FIG. 13. In general part 'C' will direct each column straight down. At the bottom of the assembly Part 'C' is flipped 180° vertically. The center of the sheet identifies if a column is a water or air column. As illustrated, the columns in assembly B alternate between water and air with the left-most column being an air column.

The fill pack is constructed by alternating assembly A with assembly B. In the cross-sectional view, every water column on assembly A is sandwiched between two air columns on the assembly B; one in front and one behind. Likewise every water column of assembly B is sandwiched between two air columns on assembly A. An indirect heat exchanger is then constructed where the warm water in one column is cooled by the cool air passing in columns in front and in back of it.

The advantage of embodiment illustrated in FIGS. 11 through 13 is that instead of a full intermediate sheet, only the top and bottom of the intermediate sheet is needed. For a 4-foot high pack with 8" wide columns, the combined height of Part 'A' and Part 'C' would be 16", savings two thirds of the material of the intermediate sheet. Since every other sheet is an intermediate sheet, this embodiment will save 33% of the materials for a 4-foot pack and even more for taller packs.

FIG. 14A illustrates a cross section of part B, of FIG. 11.

FIG. 14B illustrates a cross section taken in the middle of the fill-pack illustrated in FIG. 10. The ribs/ridges of the sheets have been exaggerated to show sealing points. An individual sheet is shown in heavy line in the middle of the pack. Each sheet is a mirror image of the adjacent sheets on each side. Each set of adjacent sheets defines a set of channels. All heat transfer occurs across these sheets. Water paths are denoted by cross-hatches. The cross-sectional areas of the water and air paths are equal and should result in an airflow split of 55%/45% with typical water loading. A checkerboard pattern of air-channels and water-channels are shown.

Figure 15:
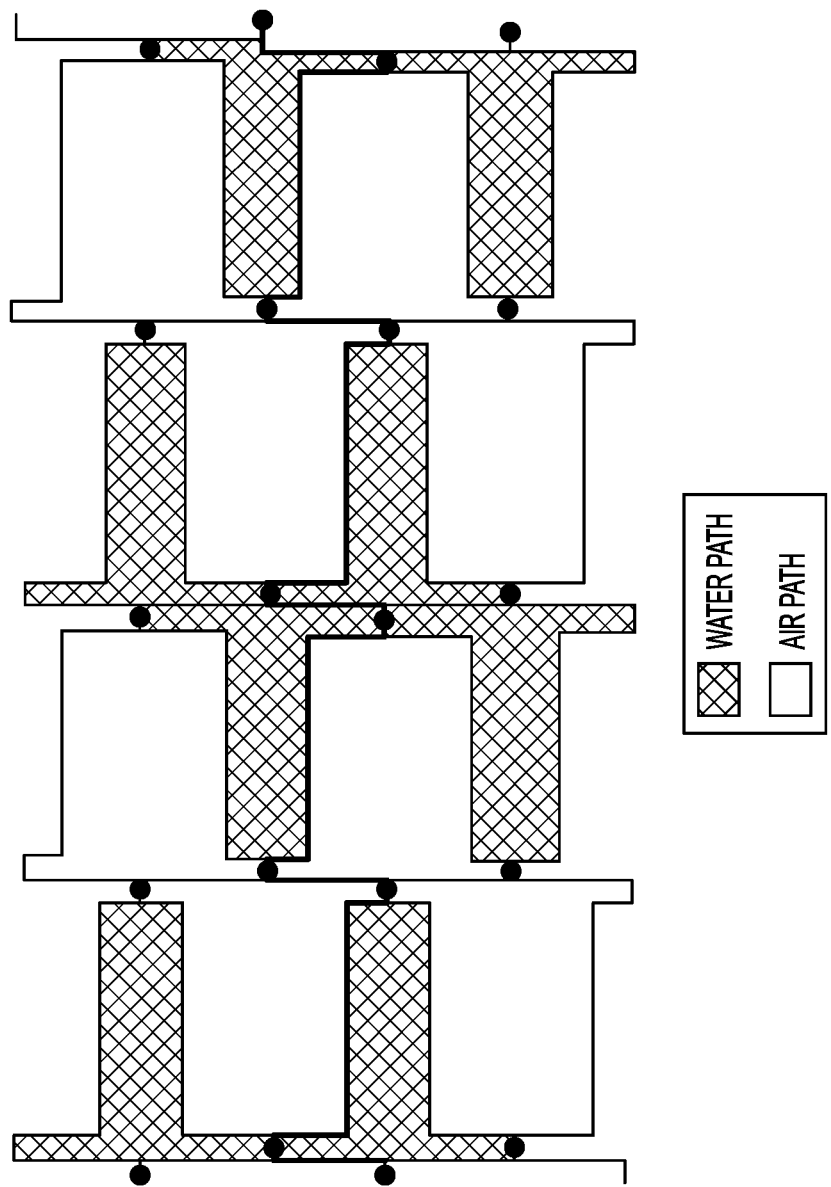
FIG. 15 is a cross-sectional representation of a fill pack similar to the fill pack shown in FIG. 10, but in which the profiles of the sheets are modified to create different size cross-sectional areas for the water and air flow paths.

FIG. 15 shows an embodiment in which the profile of the sheets are modified such that the designated water channels (with cross-hatches) are smaller than the designated air path. This will result in an airflow split such that the amount of air passing through the air path is >55%. The airflow split can be modified by changing the ratio of the water-path area to air-path area. Again an individual sheet is shown in heavy line in the middle of the pack. Each set of adjacent sheets, with each sheet a mirror image of adjacent sheets, defines a set of channels.

Figure 16:
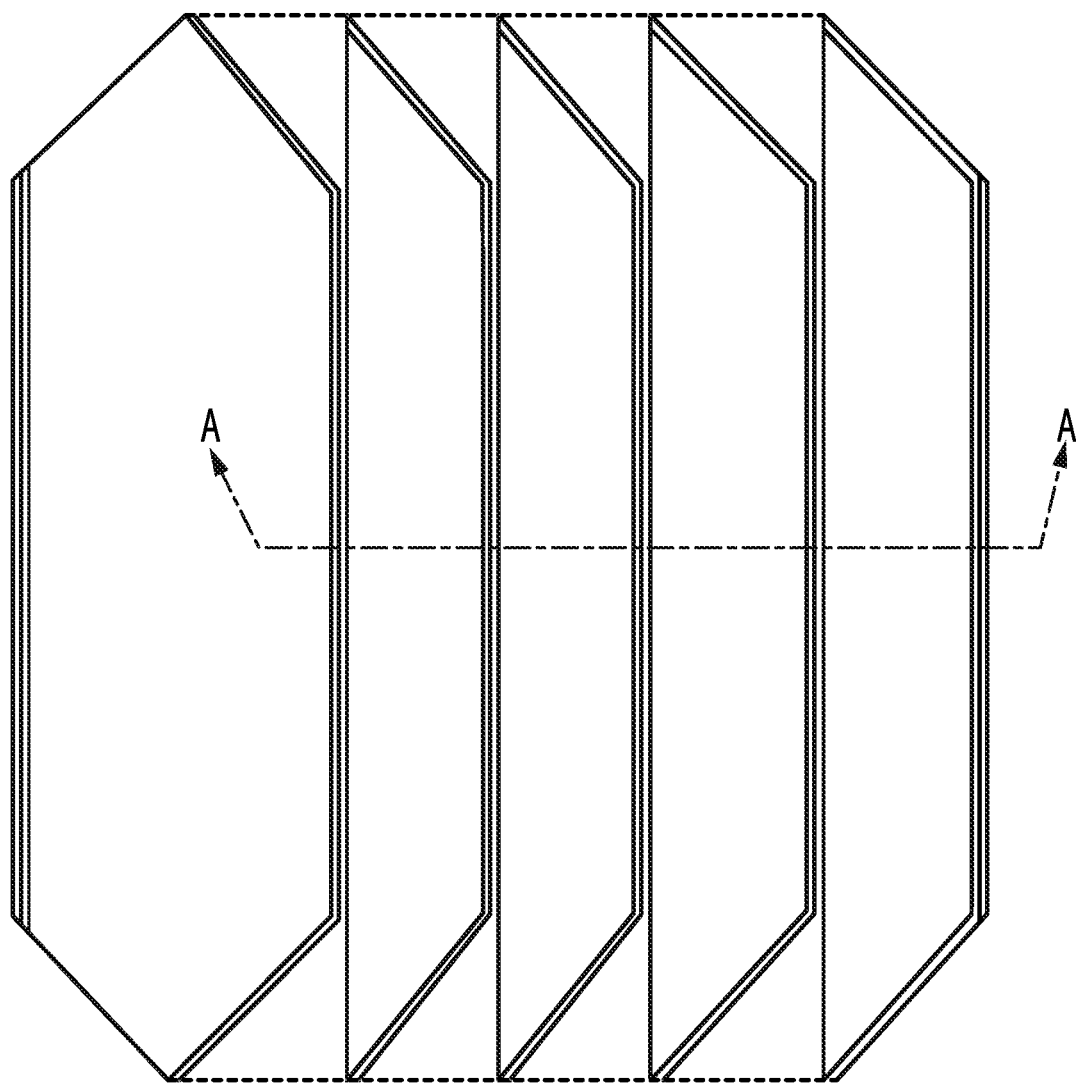
FIG. 16 is a representation of a single sheet embodiment of the vertical column indirect heat exchange fill pack aspect of the invention in which single lines indicate structure, e.g., a ridge, coming out of the plane of the sheet, double lines indicate structure going into the plane of the sheet; and triple lines indicate structure coming out of the plane of the sheet next to structure going into the plane of the sheet. No intermediate sheet is used in this embodiment.
Figure 17:
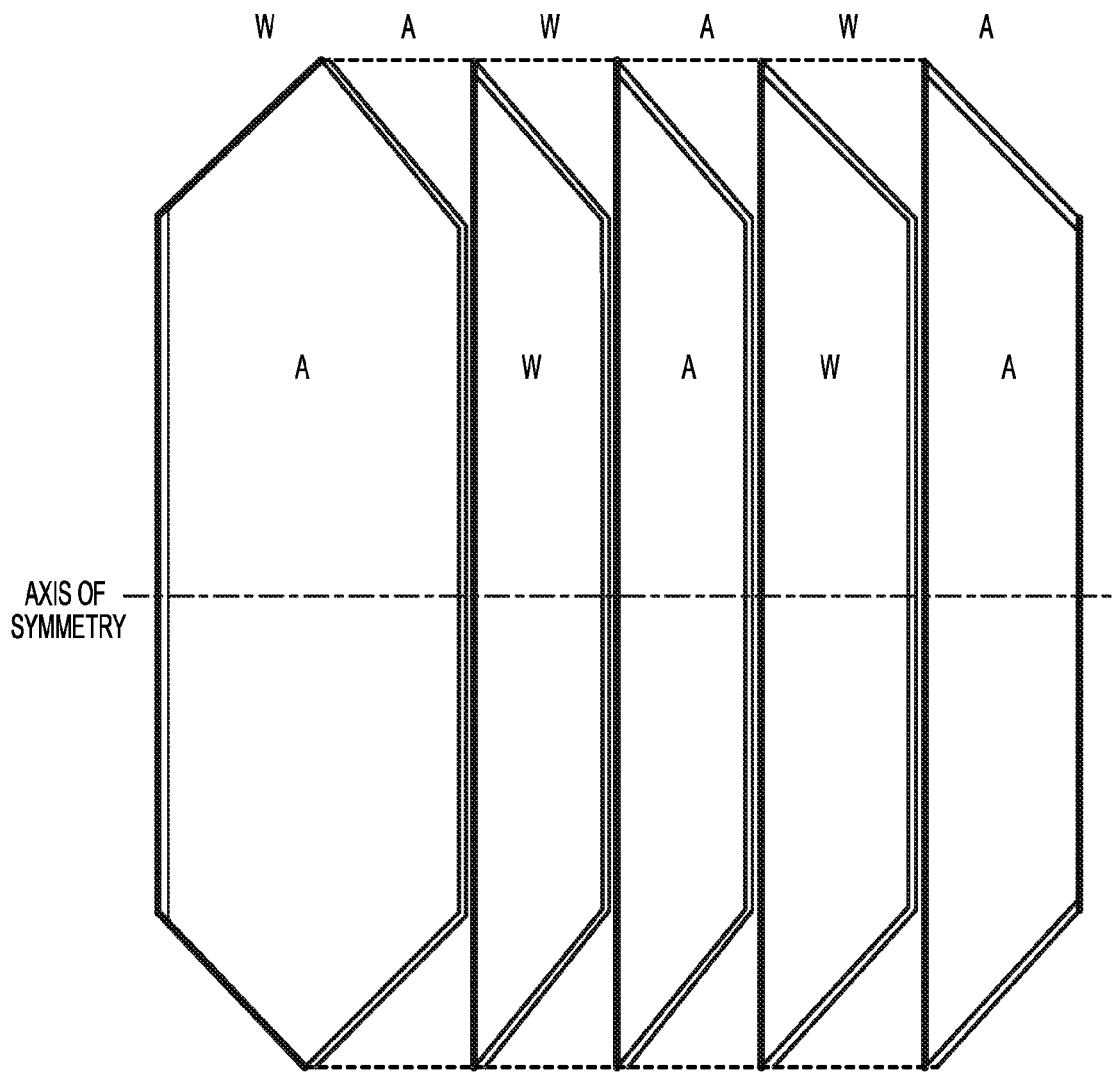
FIG. 17 is another representation of the sheet of FIG. 16, in which the heavy lines represent structure, e.g., ridges, coming out of the plane of the sheet. When this face of the sheet is paired with a second sheet of the same construction but rotated 180° about the axis of symmetry, channels are formed as indicated by the A (air) and W (water) designations.

FIG. 16 shows another embodiment of the invention. This embodiment completely eliminates the multiple-element sheet assembly of FIGS. 11-13. According to this embodiment, the complete bi-zonal fill may constructed using a single repeating sheet. On Figure, 16 single lines indicate a bonding ridge coming out of the plane of the sheet, and double lines indicate a bonding ridge going into the plane of the sheet. Triple lines indicate a bonding ridge coming out of the sheet next to a bonding ridge going into the sheet. The sheet is symmetrical about a horizontal axis at the midsection. Taking a first sheet having the orientation shown in FIG. 16, and by attaching a second sheet flipped 180° about this axis atop the first sheet, the bonding surfaces indicated by single lines will mate and form the channels indicated by the heavy lines in FIG. 17.

Figure 18:
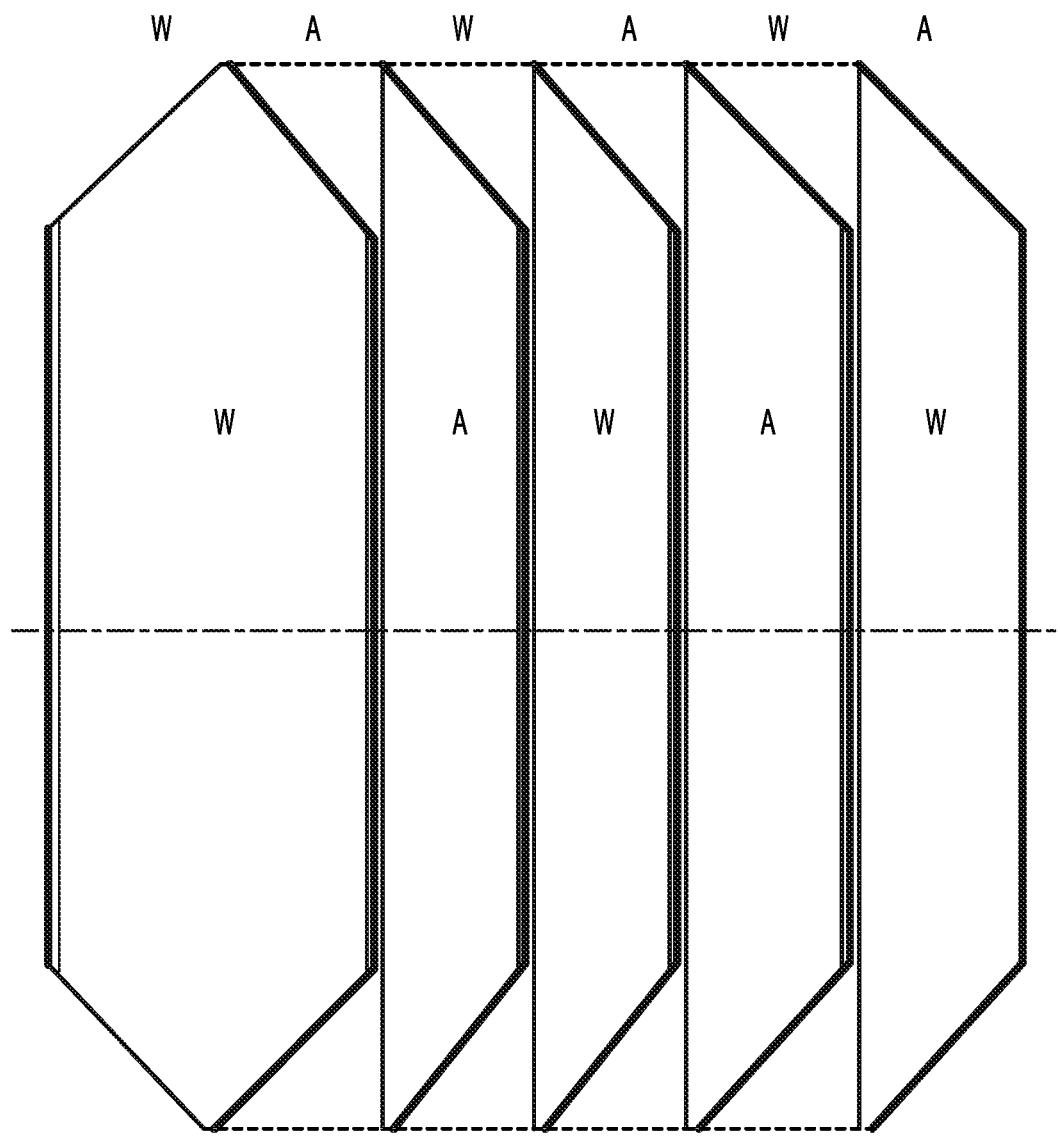
FIG. 18 a representation of the reverse side of the sheet shown in FIG. 17, in which the heavy lines represent structure, e.g., ridges, coming out of the plane of the sheet. When this face of the sheet is paired with a second sheet of the same construction but rotated 180° about the axis of symmetry, channels are formed as indicated by the A (air) and W (water) designations.

By attaching a third sheet flipped 180° about this axis behind the first sheet, the bonding surfaces indicated by double lines will mate and form the channels indicated by the heavy lines in FIG. 18. Thus with multiple copies of this single sheet, a fill pack can be assembled without resorting to the three-part construction shown in FIGS. 11-13 or with intermediate corrugated fill sheets. As with previous designs, the cross-sectional area of the water-path and air path can be adjusted by changing the height of the bonding surfaces. The advantage of this design is that it completely eliminates corrugated sheet, makes assembly simpler, and requires only a single mold for thermoforming.

Figure 19:
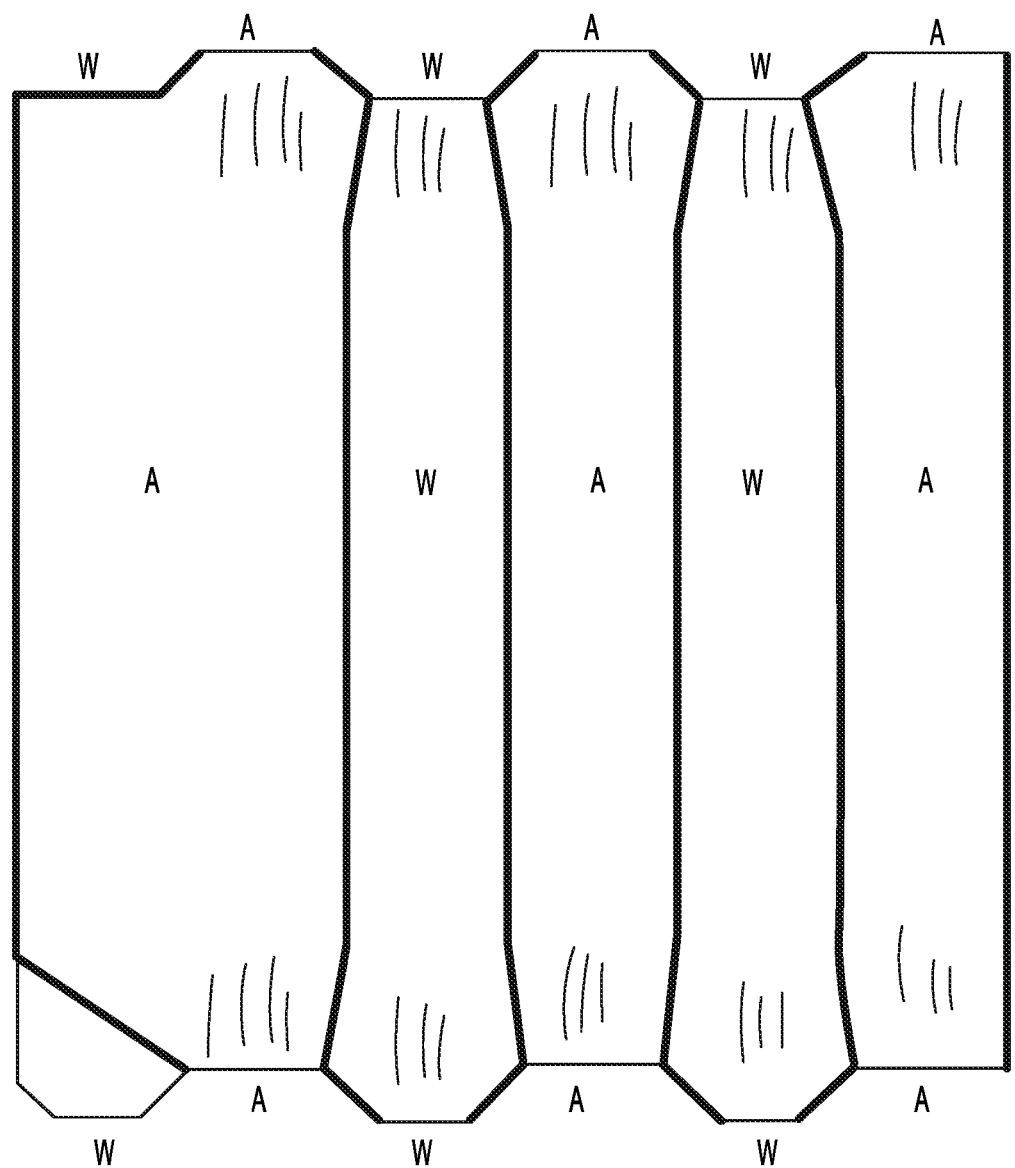
FIG. 19 is a representation of a fill packet sheet with straight columns and crenellated top and bottom sections to allow for stacking.
Figure 20:
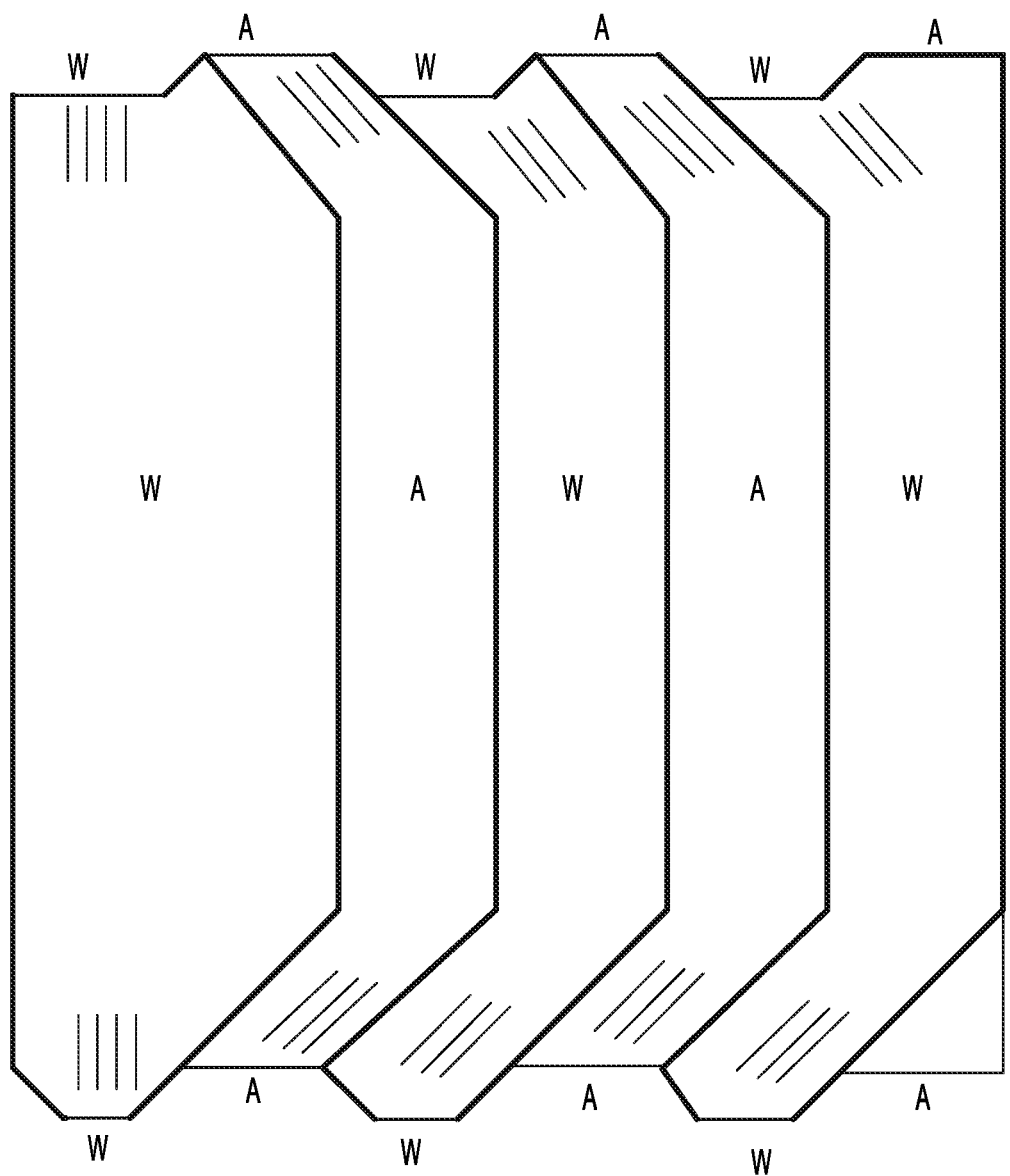
FIG. 20 is a representation of a fill packet sheet with indexed columns and crenellated top and bottom sections to allow for stacking.

It would be an advantage to be able to increase the height of the fill pack without having to make separate thermoforming molds or gluing together sheets of fill to make a taller sheet. Also, assembling very tall fill packs in cooling towers becomes difficult. The difficulty in simply stacking bi-zonal fill packs on top of each other is that if the channels do not line up exactly, water can get into an air-channel which reduces the dry-cooling ability of the pack. FIGS. 19 through 22 illustrate an embodiment of the invention that allows for a stackable fill pack. FIG. 19 shows the straight channels, and FIG. 20 shows the indexed channels. The dark lines indicate the seal points. The top and bottom of the fill are crenellated to allow stacked packs to nest together. The crenellation at the top is evenly spaced—with the water channels always notched down and the air channels protruding upwards. The crenellation at the bottom is not evenly spaced. The water channel is narrower and the air channel is wider. The water channel tapers to a funnel shape. The bottom air-channel profile is slightly deeper and wider than the water-channel profile. When fill packs are stacked, the bottom of one pack's water channels will then touch the top of the next pack's water channels, while a gap will remain between the air channels of the two packs. This arrangement will prevent water from a water channel from leaking into an air channel.

Figure 21:
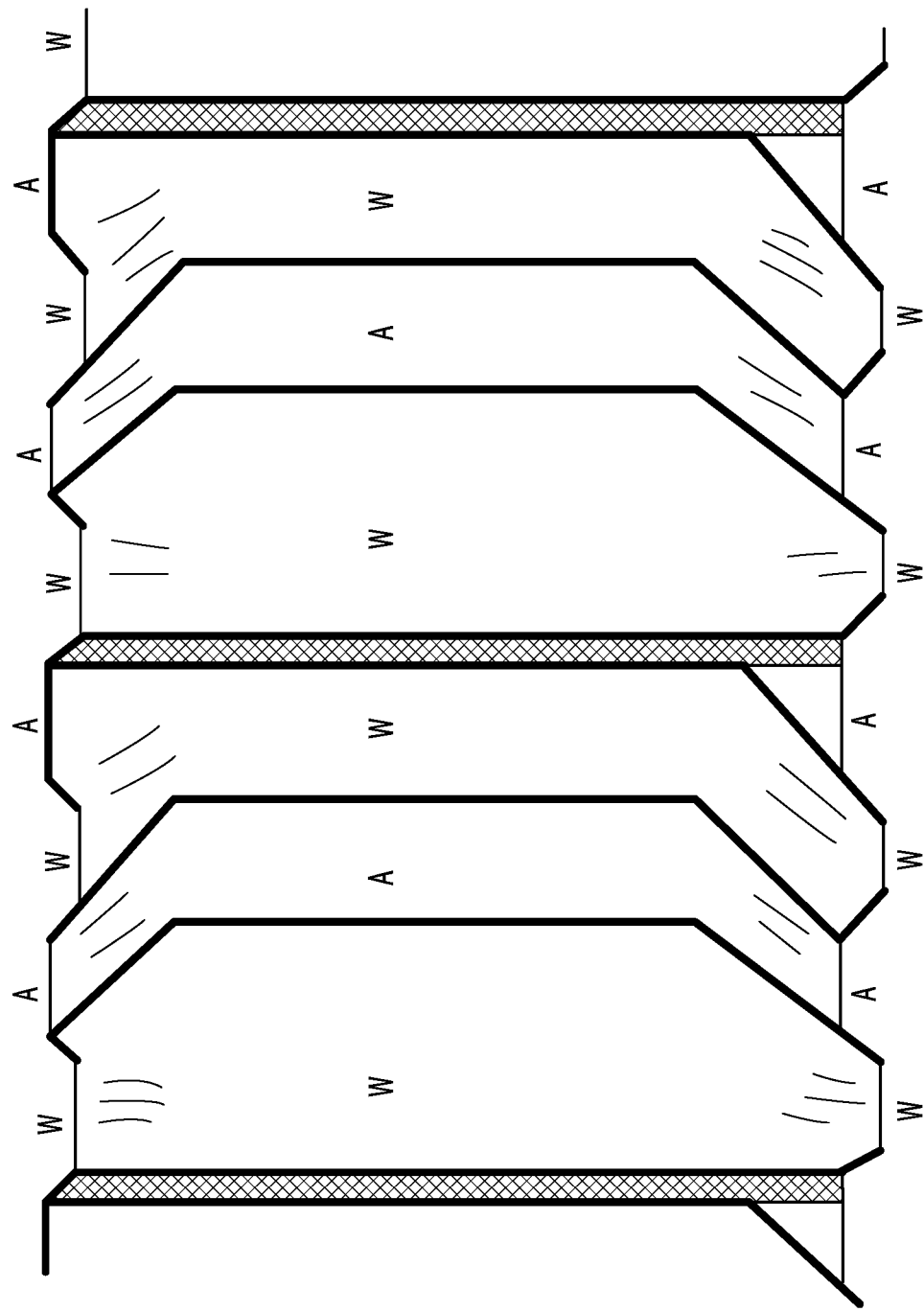
FIG. 21 is a representation of a fill packet sheet with crenellated indexed channels and a four-channel repeating motif to facilitated manufacture of longer fill packets.
Figure 22:
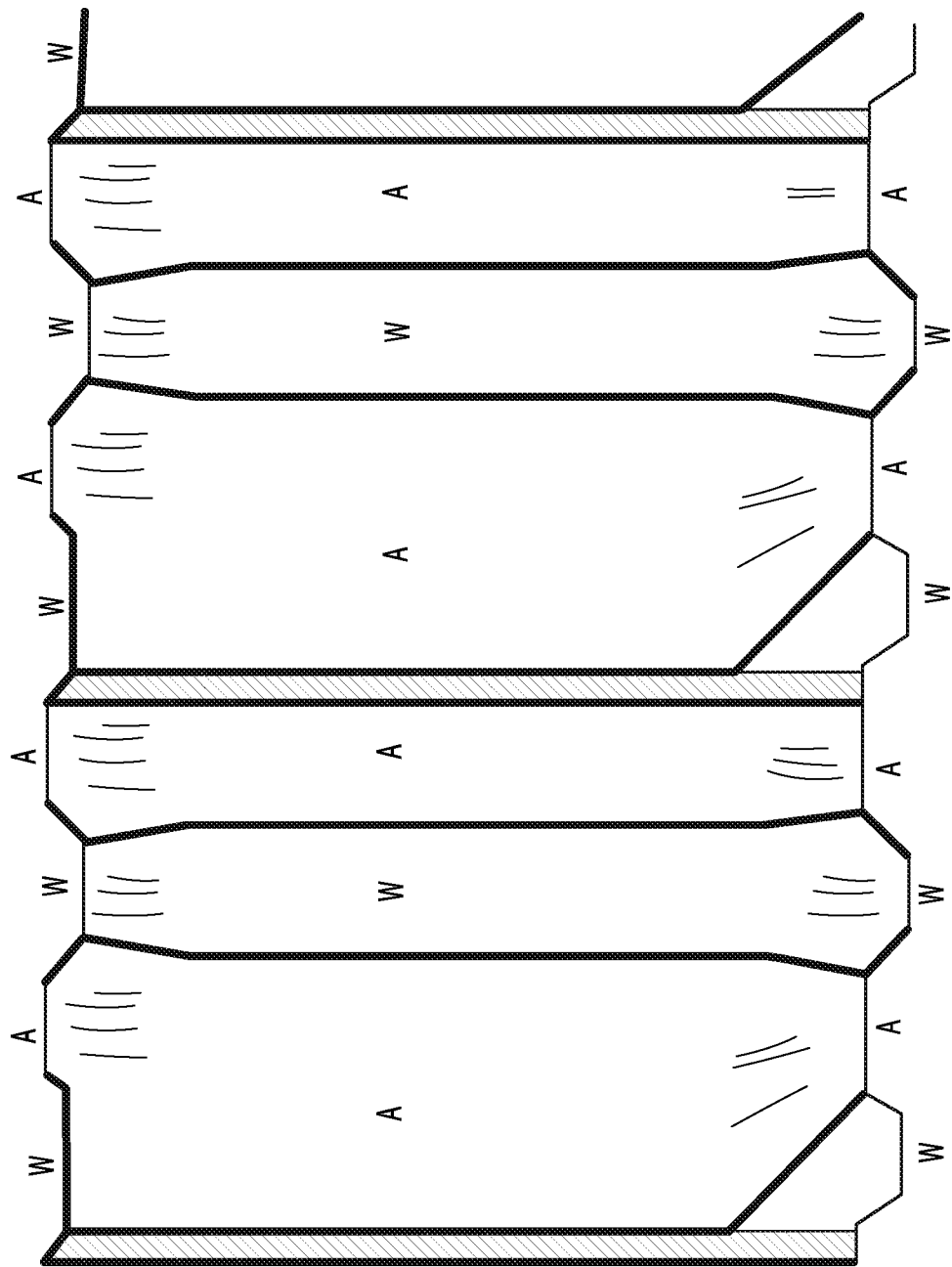
FIG. 22 is a representation of a fill packet sheet with crenellated straight channels and a four-channel repeating motif to facilitate manufacture of longer fill packets.

Typical thermoforming machines used to make fill have a maximum forming area of approximately 4'×4'. Fill can be formed larger than this in one direction if there is a repeating pattern. FIGS. 21 and 22 illustrated an embodiment that allows wider fill-packs to be assembled. The heavy lines indicate seal points. The shaded areas show potential cut lines. Both FIGS. 21 and 22 indicate a cut lines after each of 2 repeating motifs. If, for example, each motif was 3' long on a 4' wide sheet, then fill packs that were 6' or 9' wide by 4' high could be assembled. By stacking two layers of crenellated-fill-packs, a cooling tower could be equipped with 8' high of fill.

Figure 23:
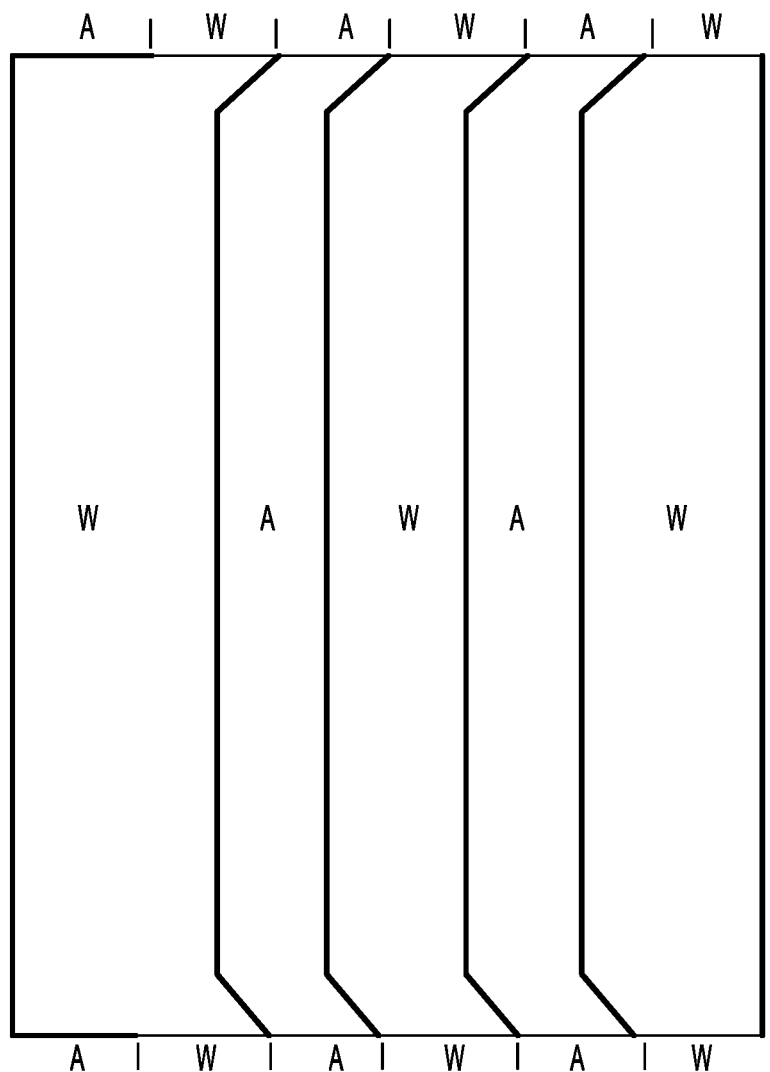
FIG. 23 is representation of a first sheet for the construction of a cooling tower fill pack having overlapping indirect heat exchange channels, in which the columns are indexed one-half a column width to the left.
Figure 24:
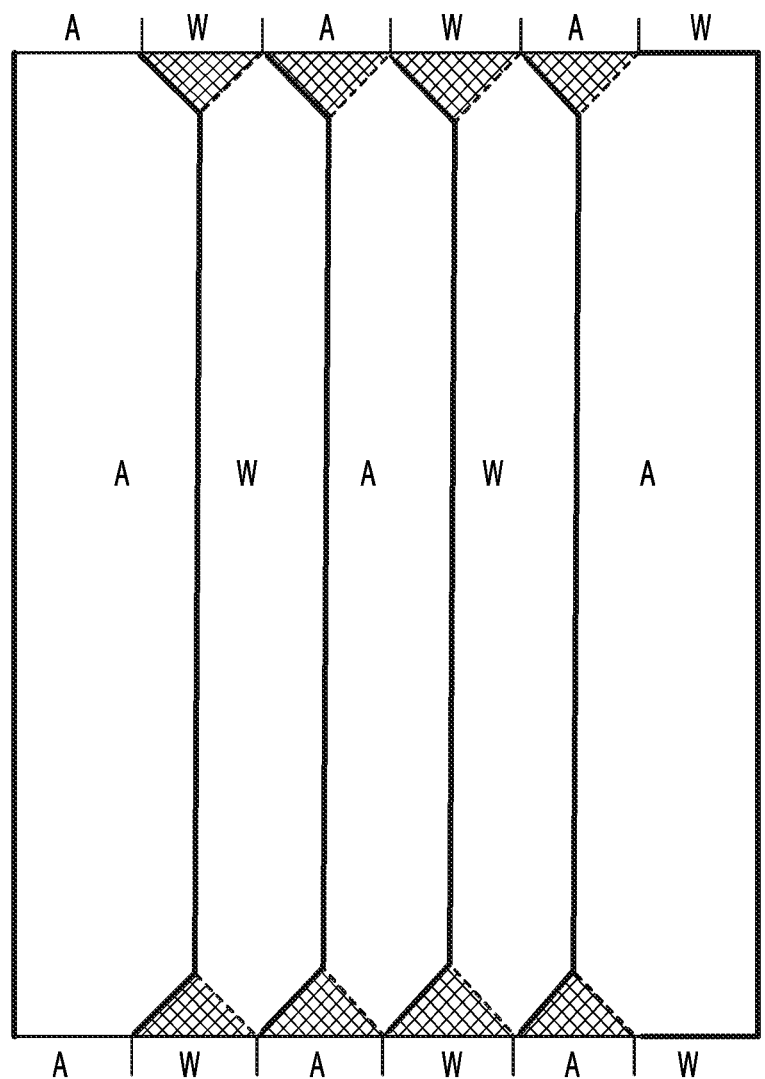
FIG. 24 is a representation of a second sheet for the construction of a cooling tower fill pack having overlapping indirect heat exchange channels, in which the columns are indexed one-half a column width to the right. Shaded portions of the figure represent areas where there is no indirect heat exchange.

FIG. 23 illustrates a modification of FIG. 10 such that the columns are indexed only ½ column width to the left. FIG. 24 illustrates the second sheet in this design where all the columns are indexed ½ a column width to the right. FIG. 23 shows an embodiment of the invention where, like FIG. 10, the indirect heat exchanger (shaded) covers more than 50% of the fill-pack area. At the top and bottom of each column the unshaded triangles are areas where there is no indirect contact of an air column with a water column and therefore no indirect heat transfer. Good practice has the hypotenuse of these triangles to be at least 45° from the horizontal. If a column was 1-foot wide, then the area of each triangle would be 0.5 ft$^2$ for a total area of 1 ft$^2$ of no indirect heat exchanger per column. This area is the same regardless of the height of a column. For a 4' high column, 25% of the area of the column is not part of the indirect heat exchanger; for a two-foot high column this would increase to 50%.

Both outside columns are now double-wide columns, as compared to the embodiment of FIG. 10 in which only the left-side was a double column. But like the embodiment of FIG. 10, the double columns are indirect heat exchangers since a water double-channel will be sandwiched between two air double-channels. On FIG. 24 the areas of no indirect contact between water and air columns are shaded. If the columns are 1-foot wide and the angles are again at 45°, the shaded triangles are $\sqrt{((1/2)^2+(1/2)^2)}=0.707'$ on a side. The area of each shaded triangle is $(0.707)^2\times\frac{1}{2}=\frac{1}{4}$ ft$^2$. In FIG. 24 there are 8 shaded triangles for a total of 2 ft$^2$. If the Sheet is 6' wide by 4' high then there are 24 ft$^2$ of sheet area. The area that is not part of the indirect heat exchanger is 2/24=8.3%. Even if the sheet was only 2' high the percentage of area that is not part of the indirect heat exchanger is only 2/12=16.7%.

Figure 25:
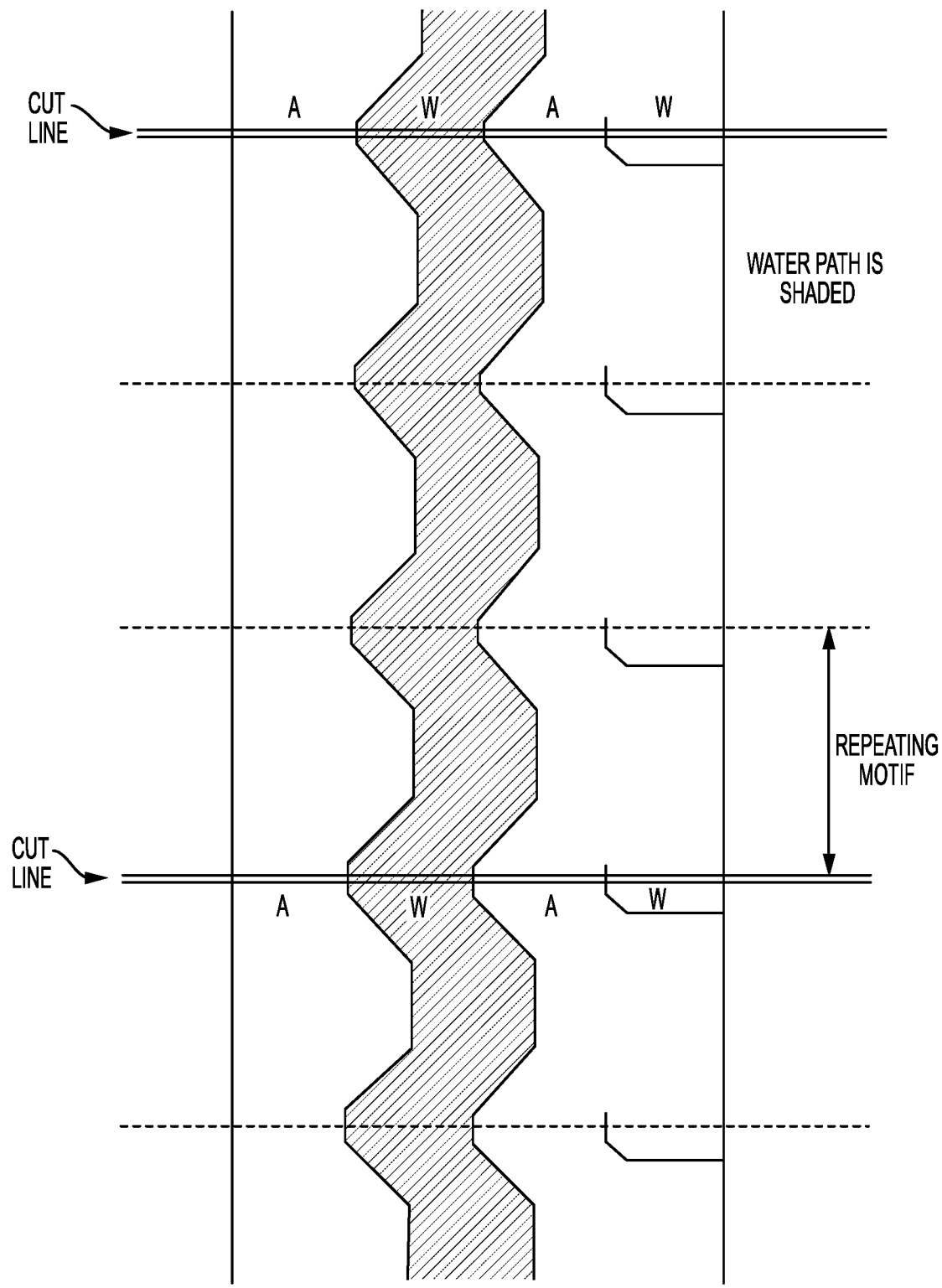
FIG. 25 illustrates how the sheet of FIG. 24 may be thermoformed on standard equipment to make tall fill packs and eliminating the requirement for stacking.
Figure 26:
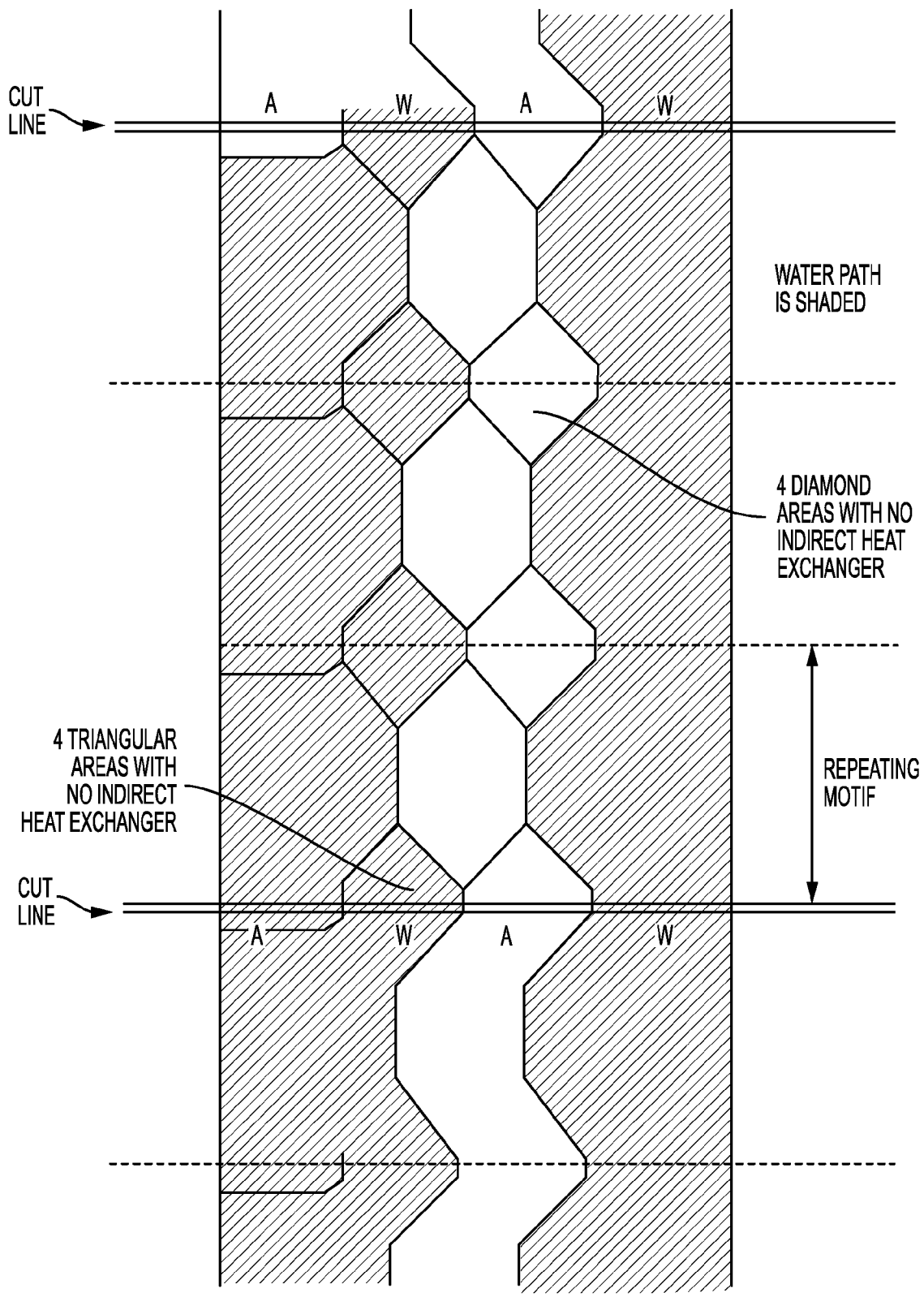
FIG. 26 illustrates how the sheet of FIG. 23 may be thermoformed on standard equipment to make tall fill packs and eliminating the requirement for stacking.

FIGS. 25 and 26 illustrate how this embodiment can be thermoformed on standard equipment to make tall fill packs and eliminating the requirement for stacking. The designs in FIGS. 25 and 26 consist of a two-foot long repeating motif on a four-foot wide sheet. The repeating motif is shown with dashed-lines. This repeating motif allows a four-foot wide fill pack to be constructed in heights of 2', 4', 6', 8', etc. In FIGS. 25 and 26 cut lines are shown that would produce a 6' high fill pack. In FIG. 26 areas where there will be no indirect heat exchanger are illustrated as 4 diamond-shaped areas and 4 triangular-shaped areas. Each triangular-shaped area is ¼ ft$^2$ while each diamond shaped area is ½ ft$^2$. The total area with no indirect heat exchanger is then 3 ft$^2$. Since each sheet is 24 ft$^2$, there will be 21/24=87.5% of the fill area as an indirect heat exchanger.

This invention will require a different water distribution method than a standard cooling tower. Each water column will require a separate spray-branch. By aligning the fill packs a single spray branch can extend the entire length or width of a cell. With a 1' wide column, there would need to be a spray branch every 1-foot. The number of spray branches can be reduced by having 2 separate spray systems. One would be a standard spray system and would be used when the tower was operating in a fully wet mode. A second spray system would be located over every other column and would be used when the system was operating in a "dry" mode. In a typical 36'×36' cell this will result in 18 additional spray branches to be used when operating in the dry mode. The number of spray branches can be reduced by aligning the fill packs as shown in FIG. 27. The fill packs used in FIG. 27 are 4' long by 1' wide by 6' high, though the height is not important. Each fill pack has 17 sheets spaced approximately 0.75" apart. The fill packs shown have four channels as shown in FIGS. 25 and 26 though any of the embodiments of the invention could as easily be used. By alternating the orientation of the blocks when assembling the fill in some places two water-columns will be next to each other allowing a single spray branch to feed two columns. On the 36' wide cell shown in FIG. 27 only 14 secondary spray branches are required.

This minimal amount of additional spray-branches is a dramatic improvement over the prior art. U.S. Pat. No. 3,997,635 describes using separate spray nozzles between parallel sheets. Similar designs are used in U.S. Pat. Nos. 4,337,216 and 5,775,409. In this prior art, to form an indirect heat exchanger, spray branches must be placed along every other sheet. For the cell in FIG. 27, the prior art would require 8 spray branches each 36' long for every foot of cell width. Since the cell is 36' wide this will result in 8×36=288 spray branches. It would be impractical to equip a cell in this manner. As noted in the previous paragraph, with this invention the cell could be treated with as few as 14 additional spray branches.

The descriptions of this invention have not specified material of construction. Typically fill is made of PVC which has poor thermal conductivity. In the indirect heat transfer mode this poor conductivity will hurt performance. If the PVC sheet and corrugations are kept thin then problem is lessened. Different plastics or metal sheets with higher thermal conductivity would improve the heat transfer. In particular stainless steel alloys such as 304 or 430 would improve the indirect cooling properties.

The invention claimed is:

1. A cooling tower comprising cooling tower fill arranged for the cooling of process water with air by indirect heat exchange, in which the fill is configured with a first set of channels and a second set of channels, said first and second set of channels interleaved with one-another so that heat exchange occurs across material separating said channels from one-another, in which said channels are created by one or more fill packs, each fill pack comprising layers of stacked corrugated sheets, each corrugated sheet having a longitudinal axis that is shifted 30° to 90° relative to a longitudinal axis of adjacent corrugated sheets, each corrugated sheet separated from an adjacent corrugated sheet by an intermediate sheet, said cooling tower further comprising omnidirectional fill arranged between said fill packs.

2. A cooling tower comprising cooling tower fill arranged for the cooling of process water with air by indirect heat exchange, in which the fill is configured with a first set of channels and a second set of channels, said first and second set of channels interleaved with one-another so that heat exchange occurs across material separating said channels from one-another, in which said channels are created by one or more fill packs, each fill pack comprising layers of stacked corrugated sheets, each corrugated sheet having a longitudinal axis that is shifted 30° to 90° relative to a longitudinal axis of adjacent corrugated sheets, each corrugated sheet separated from an adjacent corrugated sheet by an intermediate sheet, wherein internal intermediate sheets have beveled corners to allow fluid or air communication to isolated areas of said fill pack.

3. A cooling tower comprising cooling tower fill arranged for the cooling of process water with air by indirect heat exchange, in which the fill is configured with a first set of channels and a second set of channels, said first and second set of channels interleaved with one-another so that heat exchange occurs across material separating said channels from one-another, wherein said first set of channels are oriented parallel to a first edge of said fill from a top of said fill to a bottom of said fill, and wherein said second set of channels are oriented diagonally relative to said first edge of said fill for a distance of one channel width beginning at a topmost section of said fill, and are oriented parallel to said first edge of said fill through a middle section of said fill.

4. A cooling tower comprising cooling tower fill arranged for the cooling of process water with air by indirect heat exchange, in which the fill is configured with a first set of channels and a second set of channels, said first and second set of channels interleaved with one-another so that heat exchange occurs across material separating said channels from one-another, wherein said first set of channels are oriented diagonally relative to a first edge of said fill for a distance of one-half channel width in a first direction at a topmost section of said fill, are oriented parallel to said first edge of said fill through a middle section of said fill, and wherein said second set of channels are oriented diagonally relative to said first edge of said fill for a distance of one-half channel width in a second direction at said topmost section of said fill, and are oriented parallel to said first edge of said fill through a middle section of said fill.

* * * * *